United States Patent
Magerramov et al.

(10) Patent No.: US 11,153,195 B1
(45) Date of Patent: Oct. 19, 2021

(54) PACKET PROCESSING SERVICE CONFIGURATION CHANGE PROPAGATION MANAGEMENT

(71) Applicant: Amazon Technologies, Inc., Seattle, WA (US)

(72) Inventors: Joseph Elmar Magerramov, Bellevue, WA (US); Ethan Joseph Torretta, Edmonds, WA (US); Stewart Allen, Seattle, WA (US)

(73) Assignee: Amazon Techologies, Inc., Seattle, WA (US)

( * ) Notice: Subject to any disclaimer, the term of this patent is extended or adjusted under 35 U.S.C. 154(b) by 0 days.

(21) Appl. No.: 16/896,133

(22) Filed: Jun. 8, 2020

(51) Int. Cl.
*H04L 12/751* (2013.01)
*H04L 12/725* (2013.01)
*H04W 84/18* (2009.01)
*H04W 40/24* (2009.01)
*H04W 40/02* (2009.01)

(52) U.S. Cl.
CPC .......... *H04L 45/02* (2013.01); *H04L 45/306* (2013.01); *H04W 40/02* (2013.01); *H04W 40/246* (2013.01); *H04W 40/248* (2013.01); *H04W 84/18* (2013.01)

(58) Field of Classification Search
None
See application file for complete search history.

(56) References Cited

U.S. PATENT DOCUMENTS

| | | |
|---|---|---|
| 6,993,021 B1 | 1/2006 | Chuah et al. |
| 7,522,601 B1 | 4/2009 | Morrow |
| 7,782,782 B1 | 8/2010 | Ferguson et al. |
| 7,865,586 B2 | 1/2011 | Cohn |
| 8,244,909 B1 | 8/2012 | Hanson et al. |
| 8,331,371 B2 | 12/2012 | Judge et al. |
| 8,358,658 B2 | 1/2013 | Flynn et al. |
| 8,478,896 B2 | 7/2013 | Ehlers |
| 8,693,470 B1 | 4/2014 | Maxwell et al. |
| 9,934,273 B1 | 4/2018 | MacCarthaigh |
| 9,998,955 B1 | 6/2018 | MacCarthaigh |
| 10,097,454 B1 | 10/2018 | MacCarthaigh |
| 10,931,629 B2* | 2/2021 | Chander ............ H04L 12/4645 |
| 2001/0037406 A1 | 11/2001 | Philbrick et al. |

(Continued)

FOREIGN PATENT DOCUMENTS

| | | |
|---|---|---|
| CN | 102598591 | 7/2012 |
| EP | 1298853 | 4/2003 |

OTHER PUBLICATIONS

"A Brief Primer on Anycast", Matthew Prince, Oct. 21, 2011, pp. 1-4.

(Continued)

*Primary Examiner* — Brian S Roberts
(74) *Attorney, Agent, or Firm* — Robert C. Kowert; Kowert, Hood, Munyon, Rankin & Goetzel, P.C.

(57) ABSTRACT

Respective destination groups are provided to routing intermediaries associated with a packet processing application. The destination group comprises a set of fast-path packet processing nodes of a packet processing service to which the routing intermediaries are to transmit packets to be processed. After a determination is made that the set of fast-path nodes to be included in the destination groups has changed, the destination groups are modified gradually during an update propagation interval.

20 Claims, 11 Drawing Sheets

(56) References Cited

U.S. PATENT DOCUMENTS

| | | | |
|---|---|---|---|
| 2002/0083297 | A1 | 6/2002 | Modelski et al. |
| 2003/0198189 | A1 | 10/2003 | Roberts et al. |
| 2006/0251088 | A1 | 11/2006 | Thubert et al. |
| 2007/0115990 | A1 | 5/2007 | Asati et al. |
| 2008/0005441 | A1 | 1/2008 | Droux et al. |
| 2008/0225875 | A1 | 9/2008 | Wray et al. |
| 2009/0132552 | A1 | 5/2009 | Adya et al. |
| 2010/0074256 | A1 | 3/2010 | Seok et al. |
| 2010/0094990 | A1 | 4/2010 | Ben-Yehuda et al. |
| 2010/0281181 | A1 | 11/2010 | Johnson et al. |
| 2013/0086279 | A1* | 4/2013 | Archer .................. H04L 65/605 709/233 |
| 2014/0169168 | A1 | 6/2014 | Jalan et al. |
| 2014/0282849 | A1 | 9/2014 | Collison et al. |
| 2015/0012917 | A1* | 1/2015 | Jiang .................. H04L 63/0209 718/1 |
| 2015/0194215 | A1 | 7/2015 | Douglas et al. |
| 2015/0195178 | A1 | 7/2015 | Bhattacharya et al. |
| 2016/0261723 | A1* | 9/2016 | Bergeron ................. H04L 69/22 |
| 2016/0344798 | A1 | 11/2016 | Kapila |
| 2016/0352620 | A1* | 12/2016 | Schmutzer ............. H04L 49/90 |
| 2019/0140983 | A1* | 5/2019 | Tu .......................... H04L 43/028 |
| 2019/0386891 | A1 | 12/2019 | Chitalia et al. |
| 2020/0106744 | A1 | 4/2020 | Miriyala et al. |
| 2020/0145331 | A1* | 5/2020 | Bhandari .............. H04L 9/0861 |

OTHER PUBLICATIONS

"Amazon Elastic Compute Cloud", User Guide for Linux, API Version, Jun. 15, 2014, pp. 1-684.

Amazon Web Services, "Shuffle Sharding: massive and magical fault isolation", http://www.awsarchitectureblog.com/2014/04/shuffle-sharding.html, Sep. 17, 2014, pp. 1-6.

Costin Raiciu, et al "Improving Datacenter Performance and Robustness with Multipath TCP" SIGCOMM'11, Aug. 15-19, 2011, pp. 1-12.

Albert Greenberg, et al "VL2: A Scalable and Flexible Data Center Network" Communications of the ACM, vol. 54, No. 3, Mar. 2011, pp. 1-10.

Chuanxiong Guo, et al "BCube: A High Performance, Server-centric Network Architecture for Modular Data Centers" SIGCOMM'09 Aug. 17-21, pp. 1-12.

"On the Impact of Packet Spraying in Data Center Networks", Advait Dixit, et al., 2013, pp. 1-9.

Masahiro Satou, et al., "Server Side Networking for Cloud Data Centers", 2012 IEEE 1st International Conference on Cloud Networking (CLOUDNET), Nov. 28, 2012, pp. 17-22.

Kapil Bakshi, "Considerations for Software Defined Networking (SDN): Approaches and Use Cases", Aerospace Conference, 2013 IEEE, Mar. 2, 2013, pp. 1-9.

U.S. Appl. No. 16/450,690, filed Jun. 24, 2019, Stewart Allen et al.
U.S. Appl. No. 16/450,700, filed Jun. 24, 2019, Stewart Allen et al.
U.S. Appl. No. 16/450,720, filed Jun. 24, 2019, Stewart Allen et al.

* cited by examiner

Scenario 601A: Immediate propagation of PPS configuration changes
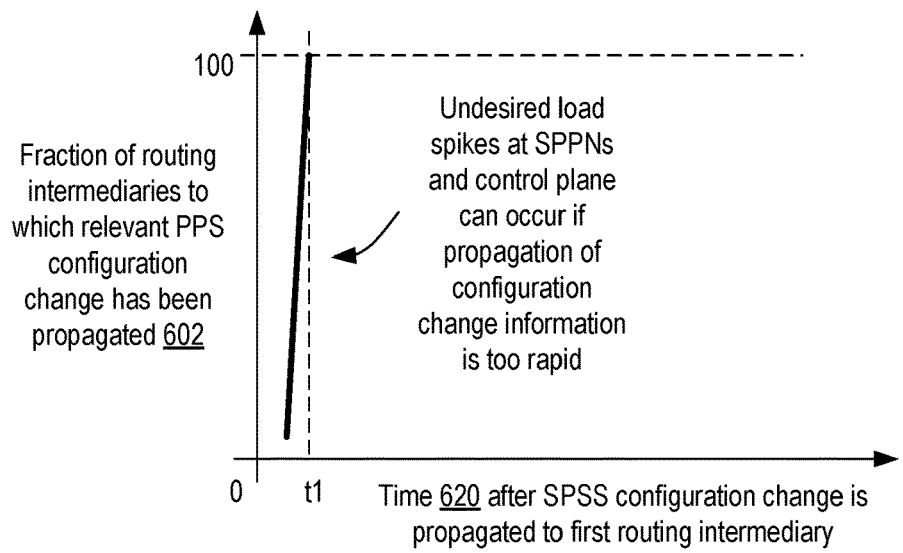
Scenario 601B: Gradual propagation of PPS configuration change
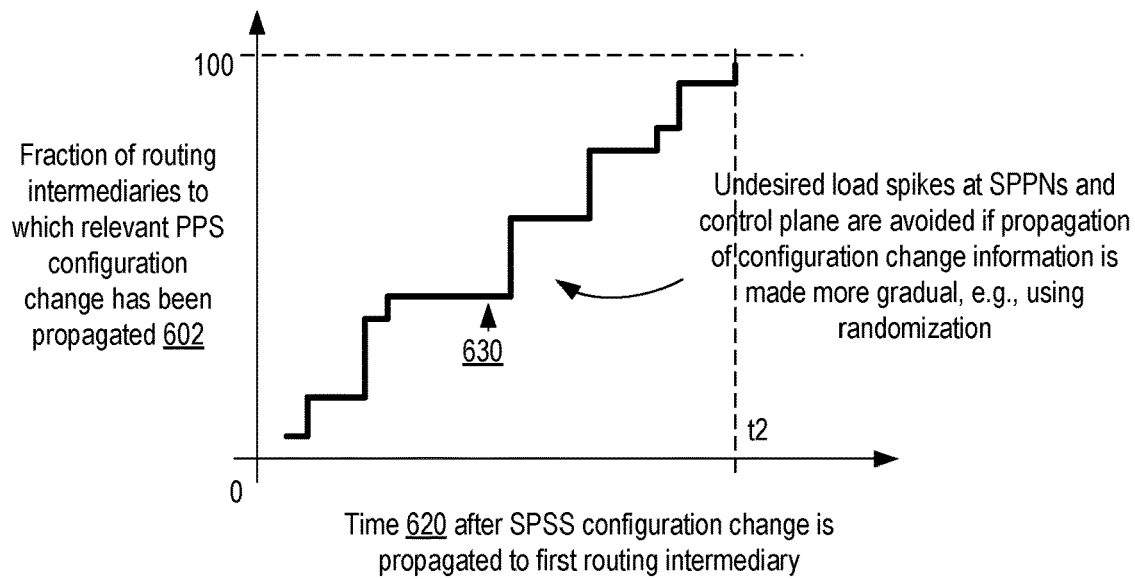
FIG. 6

Configure data plane cells of a packet processing service (PPS), including fast path packet processing nodes (FPPNs) at which packet processing applications created by PPS clients can be executed efficiently (as well as exception-path or slower-path packet processing nodes (SPPNs)); applications may comprise pipelines, with each stage of the pipelines including rules and actions (implemented for example using eBPF programs/functions that can be run on resource-constrained devices) 901

Obtain, via a programmatic interface, a request to set up an instance of an application for traffic of specified collections of communicating entities (e.g., compute instances of isolated virtual networks, hosts external to a provider, etc.) with associated routing intermediaries (e.g., virtualization management components, edge computing devices, etc.) 904

Assign a data plane cell to the pipeline instance 907

Provide initial destination lists and/or source lists to routing intermediaries of the application instance, indicating which FPPNs individual intermediaries can send packets to (e.g., using flow hashing) and/or receive packets from 913

Based on triggering conditions (e.g., as a result of adding or removing FPPNs, changing network conditions, etc.) determine that the destination lists/source lists of the routing intermediaries are to be changed 916

Instead of updating the destination lists and/or source lists of all affected routing intermediaries immediately, implement a gradual configuration change update propagation policy in which some intermediaries' lists are updated before others over a selected update propagation interval (e.g., over T seconds), so that the propagation of the configuration change does not cause undesired workload bursts 919

*FIG. 9*

At PPS control plane, determine that a new FPPN, FPPN-A, is to be added to the destination lists of N routing intermediaries   1001

Determine a gradual-update-propagation interval GI-A for FPPN-A addition   1004

Using a pseudo-random number based technique, at N points in time within GI-A, cause a respective routing intermediary (which may also be selected at random) to include FPPN-A in its destination list   1007

*FIG. 10a*

At PPS control plane, determine that an existing FPPN, FPPN-B, is to be removed from the destination lists of N routing intermediaries   1051

Cause each of the N routing intermediaries to replace FPPN-B by a respective randomly-selected other FPPN, FPPN-x, which is currently in the destination list of the routing intermediary; this results in (different, in most cases) duplicate entries in the destination lists   1054

Determine a gradual-deduplication interval GDI-A   1057

Using a pseudo-random number based technique, at N points in time within GDI-A, cause one of the N routing intermediaries (whose destination list has not yet been de-duplicated) to remove duplicate entries from its destination list   1060

*FIG. 10b*

PACKET PROCESSING SERVICE CONFIGURATION CHANGE PROPAGATION MANAGEMENT

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment. As demand for virtualization-based services at provider networks has grown, more and more networking and interconnectivity-related features may have to be added to meet the requirements of applications being implemented using the services.

BRIEF DESCRIPTION OF DRAWINGS

FIG. 6 illustrates example graphs showing possible propagation rates of configuration changes of a packet processing service, according to at least some embodiments.

FIG. 9 is a flow diagram illustrating aspects of operations that may be performed to reduce the impact of configuration changes at a packet processing service, according to at least some embodiments.

FIG. 10a and FIG. 10b are flow diagrams illustrating example techniques which may be employed in response to additions and deletions, respectively, of entries of destination lists pertaining to a packet processing application, according to at least some embodiments.

Figure 1:
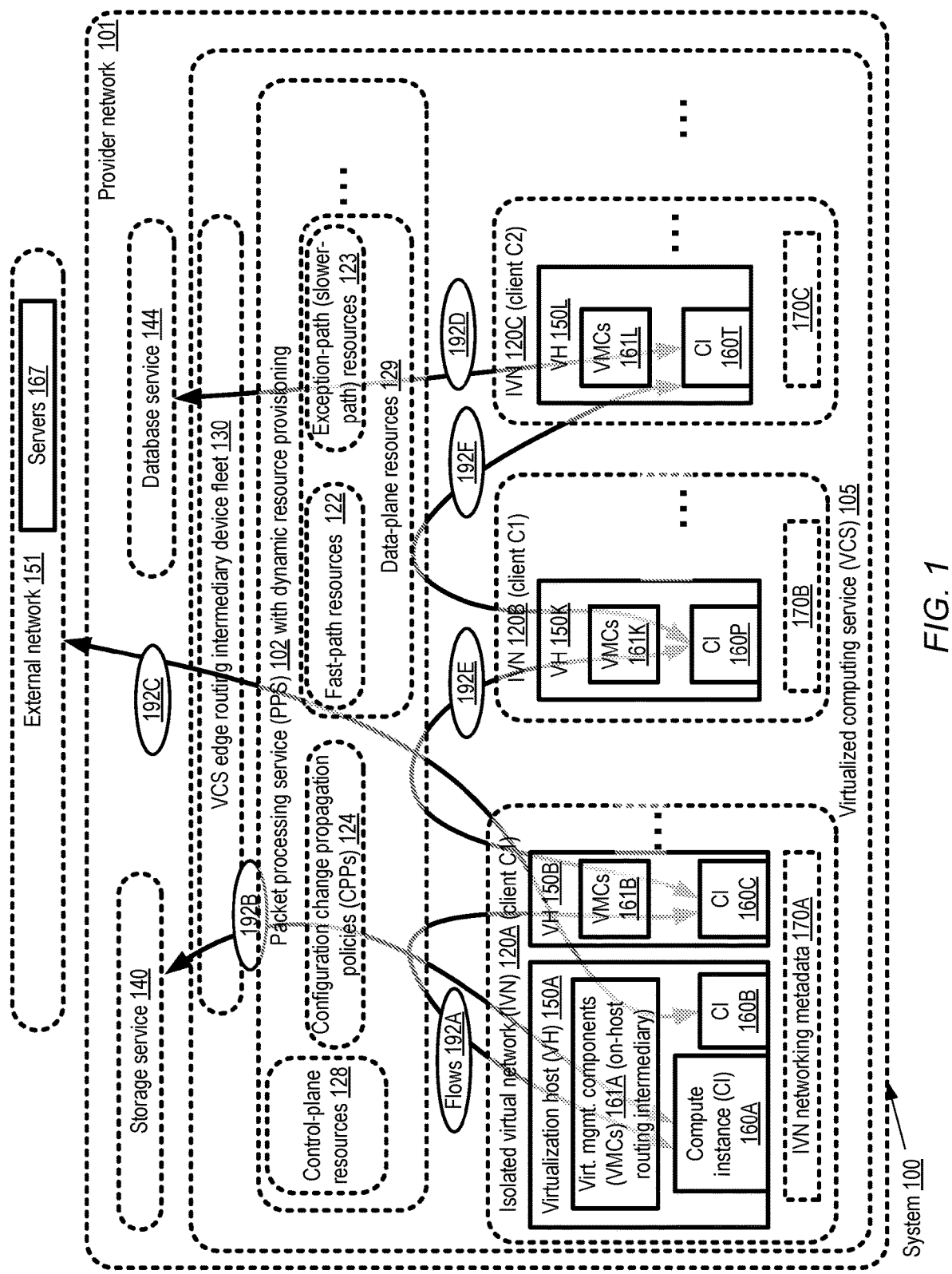
FIG. 1 illustrates an example system environment in which change propagation policies which reduce the potential negative impact of certain types of packet processing service configuration changes may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for efficiently propagating certain types of configuration changes of a packet processing service in a gradual or phased manner among devices which interact with the service, so that the rates at which packets have to be processed at the nodes of the service are not changed so abruptly that they cause performance problems for the applications being implemented using the service. A packet processing service (PPS) as described herein can be used for implementing a variety of applications including policy-based routing, network address translation, load balancing, and intrusion detection, using resources of a provider network or cloud computing environment. Details of the packet processing applications, such as pipelines whose stages represent different types of packet processing tasks to be performed sequentially or in parallel, may be provided by the clients of the PPS, while the resources used for processing the packets may be provisioned and managed by the PPS. The PPS can comprise a plurality of nodes, divided into two high-level categories: control plane nodes and data plane nodes. Control plane nodes are responsible for administrative tasks such as provisioning, propagating configuration information of the data plane, propagating rules or metadata used for packet processing operations, and so on, while data plane nodes are responsible primarily for processing packets received at the service. The packets may originate at various kinds of communicating entities (such as compute instances of a virtualized computing service of the provider network, or servers located at premises external to the provider network) and be transmitted to the packet processing service's data plane nodes via routing intermediaries such as virtualization management components or edge routers of the provider network. A given instance of a packet processing application, implemented at a collection of data plane nodes of the PPS, may be configured to receive and process packets from large numbers of communicating entities via numerous routing intermediaries. Packets resulting from the processing operations performed at the PPS (such as packets whose destination addresses have been transformed) may in turn be sent using additional routing intermediaries to numerous destinations.

The data plane nodes of a PPS may be further subdivided into fast-path processing nodes (FPPNs) and slower-path processing nodes (SPPNs), with fast-path nodes being used (ideally) for the vast majority of packets received, and slower-path nodes being used for less frequent operations in at least some embodiments. The slower-path nodes may also be referred to as "exception-path" nodes, as they may only be expected to be used relatively infrequently (i.e., in scenarios that may be considered exceptional rather than common). In various embodiments, an FPPN may maintain a cache of packet processing rules (e.g., in the form of highly efficient executable program code) for respective packet flows, and use the cached rules as often as possible to perform the packet processing tasks of the applications to which the FPPN is assigned. When a packet of a flow for which there is no rule present in the FPPN's cache is received (e.g., the very first packet of a flow) from a routing intermediary, the FPPN may indicate that a cache miss has occurred to a selected SPPN, implement a rule obtained from the selected SPPN in response to the cache miss, and store the rule in the cache. For subsequent packets of that packet flow received via the routing intermediary, the cached rule may be implemented by the FPPN, and communication between the FPPN and the SPPN may not be required. Thus, for example, if a given packet flow processed at an FPPN comprises a total of a hundred packets received from a routing intermediary, the SPPN may only be required to perform computations (to generate/provide the rule to be used for the flow) for the first packet, and the remaining 99 packets may be processed by the FPPN on its own. PPS data plane nodes may be organized into independently-administered groups called cells in various embodiments, e.g., with all the packets of a given application instance being processed within a single cell under normal operating conditions.

In order to direct packets originating at the communicating entities of an application instance to the appropriate data plane nodes of the packet processing service, the routing intermediaries may be provided various types of configuration information of the PPS data plane in at least some embodiments. For example, for a given instance of a packet processing application, a group of FPPNs may initially be assigned by the PPS control plane to receive packets from a set of communicating entities via the routing intermediaries. A list of identifiers of the assigned FPPNs, which may be referred to as a destination list herein, may be provided to each of the routing intermediaries. A given entry in a destination list may, for example, comprise an IP (Internet Protocol) address of an FPPN and a cell identifier of the cell to which the FPPN belongs in some implementations. To select the specific FPPN to which a packet is to be sent, the routing intermediary may use a flow hashing technique in at least some embodiments, in which a hash function is applied to some combination of flow identifier elements of the packet (such as a source IP address, a source port, a destination IP address, a destination port, an identifier of an isolated virtual network of the provider network to which the communicating entity belongs, an identifier of a virtual network interface established for the application, etc.), and the result of the hash function identifies a particular FPPN from the destination list. For example, if there are ten FPPNs in a destination list, with identifiers 0 to 9, the hash function may map a particular packet flow to a number between 0 and 9.

The set of FPPNs (and in some cases, SPPNs) assigned to a particular application may change over time due to a variety of reasons in different embodiments. For example, new FPPNs may be added or brought online to handle higher expected packet rates, or existing FPPNs may be removed or taken offline (at least temporarily) due to failures detected using health management algorithms, software/firmware updates and the like. In such scenarios, destination lists may potentially have to be updated at all the routing intermediaries used by the application. If, in the case of an addition of an FPPN, for example, hundreds or thousands of destination lists at respective routing intermediaries are modified near-instantaneously, this may cause large numbers of flow hashing results to also change in a short amount of time, since the number of target values to which the output of the hash functions are to be mapped has increased. In turn, this may lead to a substantial spike in the number of cache misses at some or all of the FPPNs, and to a corresponding spike in the workload of the SPPNs to which the FPPNs send cache misses. Similar problems may also arise in scenarios in which FPPNs have to be removed from destination lists. Furthermore, immediate or near-immediate propagation of such PPS data plane configuration changes may also involve rapid increases in the workloads of the PPS control plane, which is responsible for (among other tasks) sending messages indicating the configuration changes. If the data plane or control plane nodes of the PPS get overloaded due to the configuration changes, this may lead to poor performance for the packet processing applications being implemented on behalf of end users.

In order to avoid such problematic scenarios, information about PPS configuration changes which may require changes to the destination lists may be propagated in a phased or gradual manner in various embodiments. For example, a gradual-update-propagation interval (e.g., T seconds) may be determined for a given packet processing application instance by the PPS control plane. In some implementations, if a total of N routing intermediaries' destination lists have to be updated to include an added FPPN, the PPS control plane may cause each of the individual destination lists to be updated at a randomly-selected point in time within the update-propagation interval. In other implementations, the times at which updates are applied to the N destination lists may be deterministic (within the gradual-update-propagation interval) instead of being selected at random. In some embodiments, the sequence in which the N destination lists are updated may be determined using randomization. Other techniques for temporal spreading of the propagation of the changed configuration may be employed in different embodiments. In various embodiments, the propagation of the configuration change information may be orchestrated in such a way that (a) during an initial portion of the gradual-update-propagation interval, the number or proportion of routing intermediaries whose destination lists are updated is smaller than the number or proportion of routing intermediaries whose destination lists have not been updated, and (b) during a subsequent portion of the gradual-update-propagation interval, the number or proportion of routing intermediaries whose destination lists have been updated is greater than the number or proportion of routing intermediaries whose destination lists have not been updated. As a result, the set of packet flows that is directed to any given FPPN (including a newly-instantiated FPPN) may change gradually rather than abruptly, and the workload of the SPPNs and the PPS control plane may also change slowly rather than abruptly. Conceptually similar smoothing techniques may be implemented for removing FPPNs from destination lists in at least some embodiments.

As one skilled in the art will appreciate in light of this disclosure, certain embodiments may be capable of achieving various advantages, including some or all of the following: (a) ensuring that the overall performance (e.g., throughput, response times, and the like) achieved for various packet processing applications implemented at a PPS is not degraded even in scenarios in which PPS data plane configuration changes occur frequently, (b) reducing the variation in performance of such applications over time, and (c) enhancing the user experience of packet processing application administrators, e.g., by reducing the probability of alerts indicating that threshold utilization levels of data plane or control plane resources have been exceeded.

In at least some embodiments, a system may comprise one or more computing devices. The computing devices may include instructions that upon execution on or across the one or more computing devices cause the one or more computing devices to establish, e.g., by one or more control plane resources of a PPS of a provider network, a plurality of data plane cells of the packet processing service. A given data plane cell of the plurality of data plane cells may include some number of FPPNs and some number of SPPNs. An FPPN may be configured to implement respective packet processing rules (obtained from the SPPNs) on packet flows of one or more packet processing applications in various embodiments.

The PPS control plane may assign at least a portion of a particular data plane cell to process packets flowing between a first set of communicating entities and a second set of communicating entities of a packet processing application. The communicating entities may, for example, include compute instances of a virtualized computing service of the provider network, computing devices located at premises external to the provider network, and so on in different embodiments. The PPS control plane may also assign a respective destination list to each of several routing intermediaries associated with the packet processing application, and provide the destination lists to the intermediaries in at least some embodiments. A given destination list may comprise indications (e.g., IP addresses) of one or more FPPNs of the particular data plane cell. A given routing intermediary may be configured to transmit a packet originating at a communicating entity of the first set to an FPPN selected from the current destination list of the routing intermediary for implementation of a packet processing rule of the packet processing application in various embodiments.

The control plane of the PPS may determine that an additional FPPN of the particular data plane cell is to be included in the destination lists of a group of routing intermediaries in some embodiments. The control plane may then cause the destination lists to be modified to reflect the addition of the FPPN in such embodiments, such that the count of destination lists which have been updated increases gradually during a selected time period referred to as a gradual-update-propagation interval. Different gradual-update-propagation intervals may be selected for respective instances of packet processing applications by the control plane in some embodiments, e.g., bases on metrics of the size of the application such as the total number of intermediary devices whose destination lists are to be modified. In at least one embodiment a client on whose behalf the packet processing application is established may indicate a desired gradual-update-propagation interval via a programmatic interface of the PPS. In an initial portion of the interval, only a few destination lists may be updated, and most may remain unmodified; later during the interval, the fraction that has been modified may exceed the fraction that has not been modified, with all the destination lists being updated by the end of the interval. Because of the gradual propagation of the configuration change, the rate at which packets of various packet flows are directed to the new FPPN (and/or the rate at which previously unseen flows are directed to other FPPNs) may also increase gradually in at least some embodiment, thereby avoiding large bursts of cache misses at the SPPNs of the cell.

More generally, at various points in time the PPS control plane may determine that the set of FPPNs which satisfy a criterion for inclusion in the destination lists of a collection of routing intermediaries has changed. Such changes may result in decreases in the size of the set, substitutions of some FPPNs by others, or increases in the set size resulting from the configuration of new FPPNs as discussed above. Regardless of the type of change, the information about the change may be propagated gradually to the routing intermediaries in various embodiments. In some implementations, pseudo-random number based algorithms may be used for various aspects of the change propagation—e.g., to select specific points in time at which different destination lists are updated during a propagation interval, to determine the sequence in which different destination lists are updated, and so on. In one implementation, the PPS control plane may wait different (e.g., randomly-selected) amounts of time before informing individual routing intermediaries about the configuration change, and a given routing intermediary may apply the change to a destination list as soon as it is informed. In another implementation, the PPS control plane may inform all the affected routing intermediaries as soon as possible, and individual intermediaries may each use a pseudo-random number based algorithm to select a time (over an interval specified by the PPS control plane) at which the change is applied to their respective destination lists. In at least some embodiments, a decentralized approach may be taken, in which the PPS control plane does not force the routing intermediaries to synchronize their destination lists in any particular order or sequence, and instead lets the individual routing intermediaries converge their destination lists autonomously. As such, centralized control of configuration change propagation may not be required in such embodiments, which is a beneficial property in large-scale distributed systems.

With respect to deleting a FPPN (e.g., an FPPN which has failed or is being updated with new software/firmware and is hence unavailable for some time) from a set of destination lists, a two-step approach may be taken in at least some embodiments. Initially, when the PPS control plane makes a determination that a particular FPPN, FPPN-A, no longer satisfies the criteria for inclusion in the destination lists, a request to substitute FPPN-A with another FPPN of the destination list may be sent to each of the routing intermediaries. Consider the following example scenario. Three routing intermediaries, RI1, RI2, and RI3, all configured for a particular packet processing application, each start out with destination lists with the following membership [FPPN-A, FPPN-B, FPPN-C, FPPN-D]. The PPS control plane sends a request to each of the routing intermediaries to substitute FPPN-A with another FPPN of their respective lists, e.g., because FPPN-A has become unresponsive. Each of the routing intermediaries uses a pseudo-random number based algorithm to select a substitute FPPN from among FPPN-B, FPPN-C and FPPN-D, and replaces FPPN-A with the substitute in the routing intermediary's destination list, resulting in a duplicate entry. The substitute FPPN selected may differ from one routing intermediary to the other; thus, RI1's destination list may be changed to [FPPN-D, FPPN-B, FPPN-C, FPPN-D], RI2's destination list may be changed to [FPPN-B, FPPN-B, FPPN-C, FPPN-D], and RI3's destination list may be changed to [FPPN-C, FPPN-B, FPPN-C, FPPN-D]. As a result of the substitutions, the packets which were earlier being sent to FPPN-A from a given routing intermediary may now be sent to the substitute selected by that routing intermediary, resulting in (relatively small) changes in the workloads of the different FPPNs because of the randomness of the substitutions. Later, over a selected gradual-deduplication interval, the PPS control plane may cause the destination lists to be de-duplicated, e.g., by sending respective de-duplication commands or requests to the respective routing intermediaries at randomly-selected points in time in some embodiments.

In various embodiments, as mentioned above, the PPS may be implemented as one of a suite of network-accessible services of a provider network. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as the PPS. A VCS may also be referred to as an elastic compute service, virtual machines service, computing cloud service, compute engine, and/or cloud compute in various implementations.

Within a provider network, in some embodiments, groups of resources may be configured as isolated virtual networks on behalf of respective clients. As indicated by the name, an isolated virtual network (IVN) may be logically isolated from the rest of the provider network (and other networks outside the provider network) with respect to various aspects of network configuration—for example, internal or "private" IP addresses may be assigned to resources of a given IVN independently of the addresses assigned within other networks, security settings of a given IVN may restrict the sources and destinations with which resources of the IVN may communicate, and so on.

The traffic and operations of the different services of a cloud provider network (including but not limited to a PPS) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, and management of system state information). The data plane includes customer resources that are implemented on the cloud provider network (e.g., computing instances, containers, block storage volumes, databases, file storage and the like). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

In at least some embodiments, at least some data plane nodes of a PPS of a provider network may be provisioned or assigned dynamically to communicating entities or traffic endpoints, e.g., without requiring a client to submit requests to set up the nodes. As such, from the perspective of the clients of the PPS, the service may be considered "server-less" in such embodiments, in that the clients may not have to concern themselves with details regarding service node establishment, health monitoring of service nodes, scaling up or scaling down of the fleet of nodes that are used on the clients' behalf, and so on. A server-less packet processing service may transparently support desired levels of scalability, availability and reliability for various types of packet processing tasks in different embodiments.

At a high level, at least two categories of clients may utilize a PPS in various embodiments. A first category may comprise application vendors, who wish to utilize the PPS to present various types of sophisticated networking-related applications to their own end customers, and a second category may comprise such end customers themselves. For example, a packet processing application vendor may design a complex packet processing pipeline that is able to detect attempted network attacks very rapidly (e.g., using sophisticated pattern matching or machine learning algorithms), and use the PPS to implement virtual appliances that are able to implement such pipelines. End users, such as business entities which have set up their own networks within the provider network and/or at external premises, may request that instances of such virtual appliances be configured to help protect their networks. Similarly, also using PPS nodes, other vendors may offer advanced load balancing appliances, appliances for network address translation, appliances that can be used by telecommunication organizations to manage per-user bandwidth usage, and so on. In many cases, the end users of such appliances may have respective isolated virtual networks (IVNs) set up within the provider network at which the PPS is implemented, and the appliances may be utilized for traffic generated at or directed to compute instances within such IVNs. By design, the PPS may be tightly integrated with the IVN infrastructure in at least some embodiments—e.g., packet processing operations for implementing and enforcing IVN configuration requirements (e.g., security rules selected by the clients on whose behalf the IVNs have been set up, routing rules of the IVNs, and the like) may be implemented transparently, together with vendor-supplied packet processing pipelines that implement the appliance logic. In various embodiments, packet processing appliance vendors as well as their end users may be able to benefit from the seamless scalability, availability, and reliability of an PPS, while the deep integration of the PPS with IVN configuration management may ensure that all IVN-related security and routing rules will be automatically enforced as well (without requiring the vendors to explicitly integrate the security and routing rules with their appliances). As and when IVN configurations of the traffic sources and/or destinations are changed, the PPS may automatically be notified of the changes, and corresponding changes may be made to packet processing programs being implemented at the PPS nodes in various embodiments. Packet processing application vendors as well as end users may not need necessarily even be aware of IVN configuration-related packet processing tasks being performed at the PPS in some embodiments.

Example System Environment

FIG. 1 illustrates an example system environment in which change propagation policies which reduce the potential negative impact of certain types of packet processing service configuration changes may be implemented, according to at least some embodiments. As shown, system 100 may comprise resources and artifacts of a packet processing service (PPS) 102 which is implemented within a virtualized computing service 105 at a provider network 101.

The PPS 102 may include control-plane resources 128 and data-plane resources 129. The data-plane resources 129 may be organized as a collection of fast-path resources 122 and exception path or slower-path resources 123 in the depicted embodiment. Source-based dynamic provisioning of data plane resources may be implemented at the PPS 102 in the depicted embodiment: that is, for a given packet instance of a processing application, the number of fast-path and/or slow-path resources assigned may be selected (and dynamically changed if needed), e.g., by the control-plane resources 128 based on the number of traffic sources of the application instance. When the set of data-plane resources assigned to a particular packet processing application instance is changed, the control-plane resources 128 may be responsible for propagating information about the changes to the components of the VCS 105 which transmit packets to, and receive messages from, the PPS in accordance with configuration change propagation policies (CPPs) 124 in the depicted embodiment. For example, based on some CPPs 124, the control-plane resources may propagate PPS data plane configuration change information gradually over time interval to a set of routing intermediaries of VCS edge routing intermediary device fleet 130 and/or virtualization management components (VMCs) 161 at virtualization hosts of the VCS as discussed below in further detail.

The VCS 105 may comprise a collection of virtualization hosts 150 (also referred to as virtualization servers), such as VH 150A, 150B, 105K and 150L, at each of which zero or more compute instances (CIs) 160 (such as guest virtual machines) may be running at a given point in time on behalf of VCS clients. For example, CIs 160A and 160B are running at VH 150A, CI 160P is running at VH 150K, and CI 160T is running at VH 150L. Each of the virtualization hosts 150 may comprise respective virtualization management components (VMCs) 161 (e.g., VMCs 161A at VH 150A, VMCs 161B at VH 150B, VMCs 161K at VH 150K and VMCs 161L at VH 150L) in the depicted embodiment, which act as intermediaries between the CIs 160 and hardware devices (such as VH processors, memory, network interface cards (NICs) and the like). In some embodiments, at least some VMCs 161 may be implemented at offload cards of the virtualization hosts. Such offloading cards may comprise a set of processors and memory, connected to the primary CPUs of the virtualization hosts via peripheral interconnects such as PCIe (Peripheral Component Interconnect-Express), and used to offload certain types of virtualization management tasks from the primary CPUs. In various embodiments, the VMCs 161 may act as on-host routing intermediaries for network packets originating at or directed to CIs 160—e.g., outbound packets from the CIs may be routed towards their intended destinations by the VMCs, and inbound packets directed to the CIs may first be received at the VMCs before being sent on to the CIs.

At least some of the compute instances and other resources of the VCS 105 may be organized as a collection of isolated virtual networks (IVNs) 120 in the depicted embodiment. A given isolated virtual network, such as IVN 120A, 120B or 120C may comprise a collection of networked resources (including, for example, compute instances, virtualized and/or physical networking devices, hosts, etc.) allocated to a given client, which are logically isolated from (and by default, inaccessible from) resources allocated for other clients in other isolated virtual networks. The client on whose behalf an IVN is established may be granted substantial flexibility regarding network configuration for the resources of the IVN—e.g., private IP addresses for compute instances may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. Multiple IVNs may be set up on behalf of the same client in some embodiments. In the example scenario depicted in FIG. 1, IVNs 120A and 120B have been established for a client C1 of the VCS 105, while IVN 120C has been established for a different client C2. Note that although virtualization hosts 150 are shown as hosting compute instances within a single IVN in FIG. 1, at least some virtualization hosts may be utilized in multi-tenant mode in some embodiments—that is, a given VH 150 may be used for compute instances of several different clients and/or several different IVNs 120.

Clients of the VCS may utilize the compute instances 160 to run various types of applications in different embodiments. In some cases, the applications running at a given VH may communicate with resources elsewhere within the provider network 101, and/or resources outside the provider network 101, such as external network 151. Individual ones of the compute instances may be programmatically attached to one or more virtual network interfaces (VNIs) in the depicted embodiment, while individual ones of the virtualization hosts (and resources outside the VCS) may have physical network interface cards (NICs) configured. A given VNI may have one or more network addresses (e.g., Internet Protocol (IP) version 4 or version 6 addresses) assigned to it, and a NIC may also have one or more network addresses assigned to it. In order to transmit contents of packets from a CI 160 at a VH 150 to a destination external to the VH, an encapsulation protocol may be implemented at the VMCs 161 and other components of the VCS, which may be used to map VNI network addresses to physical NIC addresses (in addition to being used for other functions). Furthermore, for at least some network packet sequences sent from or directed to compute instances 160, packet processing actions such as load balancing, source address substitution or the like may be performed, e.g., with the help of the PPS 102. For example, some number of the CIs 160 may be collectively used to implement a particular application App1 of client C1, and App1 service requests may have to be load balanced among the CIs.

A sequence of network packets, referred to as a packet flow, may be transmitted between a given CI 160 and one or more traffic destinations or sources, via the VMCs acting as on-host routing intermediaries, using a packet processing pipeline implemented at least in part at the PPS 102. Similarly, packet processing pipelines may also be implemented at the PPS 102 in various embodiments for packet flows between external servers 167 and resources of the VCS 105 (or for packet flows between different external networks 151). A number of different example packet flow types are illustrated in FIG. 1; each flow may, for example, be distinguished from other flows based on an N-tuple comprising an identifier of a network protocol being used, a source network address, a source network port, a destination network address, and/or a destination network port. In some embodiments, the N-tuple used to uniquely identify a network packet flow may also comprise other elements such as an identifier of a virtual network interface used for the packets, one or more IVN identifiers, or an indication of a direction of packet transmission. Example flows 192A may comprise packets transmitted between CIs 160A and 160C within the same IVN 120A. Flows 192B may comprise packets transmitted between CI 160A and a storage service 140 of the provider network 101, e.g., via a fleet 130 of VCS edge routing intermediary devices (which may also be referred to as VCS boundary networking devices). Flows 192C may comprise packets sent between a CI 160B at IVN 120A and servers 167 at an external network 151 outside the provider network 101 (e.g., a client data center or a co-location facility); for such flows, the edge routing devices of fleet 130 may be configured as intermediary routers between the external servers 167 and the VCS resources. Flows 192D may comprise packets transmitted between a CI 160T and a database service 144. Flows 192E may include packets sent between CIs at two IVNs of the same VCS client: IVN 120A and 120B, both set up on behalf of client C1. Flows 192F may include packets transmitted between IVNs of different VCS clients: IVN 120B of client C1 and IVN 120C of client C2. In some cases, e.g., if public IP addresses assigned to the CIs are used for communication between two CIs instead of private IP addresses, the edge routers of fleet 130 may act as intermediaries, e.g., in addition to or instead of the VMCs 161.

For each of these types of network flows, various types of IVN configuration settings included in IVN networking metadata 170 (e.g., metadata 170A, 170B or 170C), such as security rules for inbound or outbound traffic and/or network access control lists (NACLs) may be enforced efficiently and transparently at the PPS 102 in the depicted embodiment. Furthermore, depending on the specific application for which the network packets are sent to or from the CIs 160, additional packet processing operations, represented for example by a pipeline comprising one or more stages designed or developed by a third-party application vendor, with each stage comprising one or more rules and/or one or more actions, may be performed at the PPS 102. Such pipelines may correspond to respective packet processing applications, with one instance of a given pipeline or application being implemented using a collection of PPS data-plane resources assigned by the PPS control plane. In some embodiments, respective pipelines may be implemented for a given network packet flow for (a) IVN configuration-related packet processing tasks and (b) vendor defined packet processing tasks. IVN integration resources implemented within the PPS (not shown in FIG. 1) may for example obtain IVN networking metadata 170 from various IVNs, generate corresponding packet processing programs and rules that enforce security and other requirements of the IVNs, and transmit the programs and rules to fast-path resources 122 (e.g., via exception-path resources 123, or directly).

A vendor of a packet processing application, such as an intrusion detection operation or a data exfiltration detection application, may submit a programmatic request to the PPS to set up an instance of a vendor-defined packet processing pipeline/application to be employed for traffic to/from a set of CIs 160 of one or more IVNs 120 in some embodiments. The vendor need not specify the particular PPS resources to be used for the pipeline in the depicted embodiment, and in fact may not even be aware of the architecture or constituent layers and nodes of the PPS. The request may include information about various stages of the pipeline, including for example respective rules to be applied (and/or programs to be run) to perform packet processing at the various stages, as well as rules to determine whether a given packet is eligible for a program. The programs and/or rules may be expressed using custom frameworks optimized for packet processing operations in various embodiments, such as eBPF (extended Berkeley Packet Filter) or the like. A number of fast path packet processing nodes (FPPNs) (implemented using a combination of hardware and software fast path resources 122) may be assigned to the CIs 160 for which the pipeline is requested, e.g., by components of the PPS control plane in the depicted embodiment. The programs and/or rules of the pipeline may be transmitted or pushed to the FPPNs automatically in some embodiments, e.g., in advance of receiving eligible packets that are to be processed using the pipelines; in other embodiments, the programs and/or rules may be stored at one or more slower-path resources 123 and transmitted to FPPNs on demand. The pipeline components (rules, programs/actions and/or associated metadata such as lookup tables) may be cached at the FPPNs in some embodiments. In various embodiments, as another preliminary configuration operation associated with pipelines, one or more entry and/or exit points (e.g., using one or more virtual network interfaces at the appropriate IVNs) may be established for each pipeline instance in response to respective programmatic requests (for example, from the vendor on whose behalf the pipeline instance is being configured).

After the pipeline elements have been deployed, in various embodiments connectivity may be enabled between the assigned FPPNs and the sources/destinations of the traffic for which the pipeline has been deployed, via respective intermediaries such as edge routing intermediaries of fleet 130 and the VMCs 161 acting as on-host routing intermediaries. At least some of the routing intermediaries may be configured to maintain respective destination lists indicating the specific FPPNs assigned to the application instances whose packets are to be sent to the PPS on behalf of communicating entities such as the CIs 160 and the external servers 167. When a packet of a flow is obtained at a routing intermediary, the routing intermediary may use flow hashing (applying one or more hash functions to the elements of the flow identifier of the packet) in at least some embodiments to select a particular FPPN from the destination list, and send the packet on to the FPPN. The FPPN may attempt to find a cached rule and/or program that is to be used to perform packet processing operations on the received packet. If such a rule or program is found in the cache, the operations indicated in the cache entry may be performed; otherwise, in at least some embodiments, a query indicating that a cache miss has occurred may be sent along with the received packet to an exception-path resource 123. The exception-path resource 123 may look up its own metadata repository comprising IVN configuration information and/or vendor-supplied pipelines. If an appropriate set of one or more pipelines (e.g., for enforcing IVN configuration settings and/or for performing vendor-defined operations) is identified, corresponding programs and/or rules may be supplied to the requesting FPPN in the depicted embodiment, where the programs/rules may be applied and cached for potential re-use. Depending on the specifics of the pipeline(s) identified, one or more packets corresponding to the received packet (e.g., versions of the packet in which one or more headers have been modified) may be transmitted to one or more destinations, and/or additional actions (such as simply dropping the received packet and/or raising an alarms about a potential network attack) may be initiated in various embodiments.

In at least some embodiments, initial destination lists may be propagated to the FPPNs by the control-plane resources 128 in various embodiments, e.g., when a new instance of a packet processing application or pipeline is established. The set of FPPNs which satisfy the criteria for assignment to a given packet processing application may change over time in various embodiments. For example, a new FPPN may be dynamically assigned to an application instance by the control-plane resources based on measured changes in application workload, or an FPPN may be dynamically selected for removal/substitution due to a failure or an impending maintenance event such as a software/firmware update. As and when the set of FPPNs to which packets are to be sent from a given routing intermediary changes, information about the changes may be sent to the intermediaries by the VCS control plane in accordance with CPPs 124 in the depicted embodiment. The destination lists may be modified at the intermediaries, resulting in changes to the set of flows whose packets are received at various FPPNs. If information about a data plane change leads to a mass, near-instantaneous change of destination lists at numerous intermediaries, this can lead to substantial spikes in the workload directed to the exception path resources—e.g., because of large increases in cache miss rates at the FPPNs. Accordingly, in at least some embodiments, a configuration change propagation policy 124 that results in the gradual distribution of the new FPPN information among the relevant routing intermediaries may be implemented. An update propagation interval may be identified for each of the application instances affected by a change in the FPPN configuration. The destination lists of the routing intermediaries used for the application instances may be modified in such a way that during an initial portion of the update propagation interval, only a few of the destination lists are changed, so that most of the packet flows of the application are routed as they were before the FPPN configuration change. During later portions of the update propagation interval, more and more of the destination lists may be updated in such embodiments, until eventually all the packet flows are routed using the updated configuration. Different approaches may be taken towards gradually propagating information about the addition of FPPNs than towards gradually propagating information about the removal of FPPNs, as discussed below in further detail.

Example Interactions Between Components of a Packet Processing Service

Figure 2:
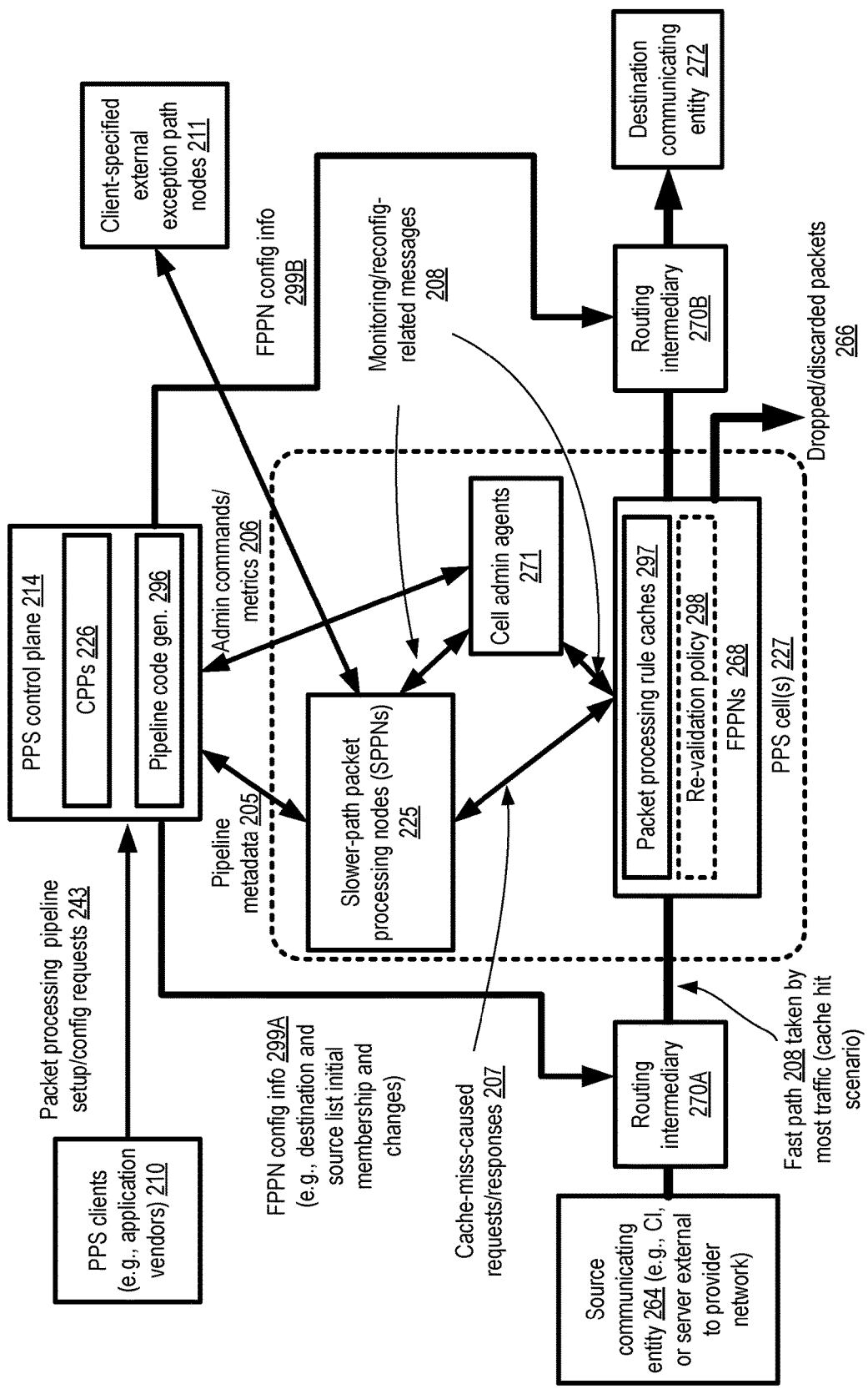
FIG. 2 illustrates example interactions between components of a packet processing service, according to at least some embodiments.

FIG. 2 illustrates example interactions between components of a packet processing service, according to at least some embodiments. In the depicted embodiment, the resources of the PPS are organized as a collection of cells 227, with individual cells comprising a respective collection of fast-path and slow-path resources. A PPS client 210 such as an application vendor may submit programmatic requests 243 to the PPS control plane 214 to set up instances of applications comprising one or more packet processing pipelines, which may be exposed to end users in the form of virtual appliances. Each pipeline may comprise one or more stages of packet processing.

For a given instance of an appliance, the PPS control plane 214 may select one or more PPS data plane cells 227 in the depicted embodiment. A given cell 227 may include a collection of fast-path packet processing nodes (FPPNs) 268 and a collection of slower-path packet processing nodes (SPPNs) 225 (which may also be termed exception path nodes). Routing intermediaries 270 (such as 270A or 270B) may transfer packets originating at source communicating entities 264 to selected FPPNs 268, and in at least some cases also transfer corresponding packets forwarded by or generated at the PPS to destination communicating entities 272. Configuration information 299 (e.g., 299A or 299B) about the specific FPPNs which are assigned to process the packets of the communicating entities may be transmitted as needed from the PPS control plane 214 to the routing intermediaries 270. For example, when the packet processing pipelines are set up, an initial destination list (indicating the set of FPPNs to which a routing intermediary is to send flow-hashed packets received from the source communicating entities) may be sent to each of the routing intermediaries configured for the source communicating entities in various embodiments. Later, as and when new FPPNs are to be added to the destination lists, or when some existing FPPN of a destination list is to be removed or replaced, information about such changes may be sent to the routing intermediaries in accordance with change propagation policies (CPPs) 226 (similar to the CPPs 124 of FIG. 1) in such a way that sudden large changes in workloads of the SPPNs are avoided. In at least one embodiment, the PPS control plane 214 may also send source lists to routing intermediaries 270, indicating the set of FPPNs from which a given routing intermediary should expect to receive packets processed by the PPS. In such an embodiment, when a routing intermediary receives a packet from an FPPN, the routing intermediary may confirm/verify, prior to forwarding the packet, that that FPPN is a member of the source list. If the FPPN from which the packet is received is not in the source list, the packet may be rejected by the routing intermediary. Source lists may also be updated gradually in some embodiments when the FPPN configuration for a given packet processing application changes, e.g., analogously to the way in which destination lists are modified. In other embodiments, source lists may be updated as quickly as possible instead of gradually.

In various embodiments, an FPPN 268 may comprise a cache 297 within which representations of the rules, actions and/or programs of the pipeline stages to be implemented at the node are stored. Pipeline stage logic may be stored in executable form in the caches in some embodiments, e.g., as byte code expressed using instructions of a register-based virtual machine optimized for implementing network processing operations, which can be used to perform operations similar to those of the extended Berkeley Packet Filter (eBPF) interface. In one implementation, for example, an eBPF program may be restricted in several ways—the maximum number of instructions may be limited, only a few 64-bit registers may be available, only forward conditional jumps may be supported, and so on. As a result of the restrictions, the pipeline logic expressed as an eBPF program may be executed very quickly, but the complexity of the work that can be accomplished using a given program may be limited. For at least some stages of the vendor-defined pipeline, the vendor may supply the program code to be used and cached in the depicted embodiment. For at least some packet processing operations, code may be produced at the PPS control plane 214 (e.g., using pipeline code generators 296) and also cached at the FPPNs 268.

Metadata 205 about the pipelines (comprising both IVN configuration related operations as well as vendor-defined operations) may be transmitted from the PPS control plane 214 to the SPPNs 225, and commands 206 to administer (e.g., monitor the health of) the cell 227 may be transmitted to one or more cell administration agents instantiated within the cell by the control plane 214. When a network packet originating at a communicating entity 264 is received at an FPPN 268, the local cache 297 may be examined (e.g., using a lookup table or a prefix matching table) to determine whether code to process the packet is present in the cache. If a cache hit occurs, i.e. if appropriate code is found, the code may be executed, and one or more packets (which may be rewritten versions of the received packet) may be sent to a destination traffic endpoint along the fast path 208. If a cache miss occurs, a request 207 may be sent to the SPPNs 225 from the FPPNs 268. In some embodiments, the SPPNs 225 of the PPS may be able to provide the code (using pipeline metadata 205) to process the packet to the FPPN, where the code may be cached for use with subsequent packets. In other embodiments, the vendor may have indicated that for at least some packets, one or more external exception-path nodes 211 may have to be used to perform at least some packet processing actions. Such client-specified external exception path resources may, for example, comprise one or more compute instances within a separate IVN (e.g., different from the IVN in which the source entities 264 and the destination endpoints 272 are configured, and different from an IVN in which the PPS cell is configured), or even a set of computing devices outside the provider network at which the PPS is implemented. If external exception path nodes 211 are to be used, which may be determined at the internal SPPNs 225 based on the pipeline metadata 205, the packet may be transmitted to the external nodes 211, where the required operations may be performed. Depending on the nature of the application being implemented using the vendor pipeline, in some cases the external nodes 211 may only have to be used for a subset of the packets of a given flow; in other cases (e.g., when decryption/encryption operations are needed for each packet, and when such operations can only be performed securely using the external nodes), each packet of the flow may have to be transmitted to the external nodes 211 in some embodiments. In at least one embodiment, just as an internal SPPN 225 may be able to provide packet processing code that can be cached at an FPPN 268 for subsequent packets of a flow, an external exception-path node 211 may also be able to provide packet processing code than can be cached as the FPPNs for subsequent packets of a flow. Depending on the results of the processing performed at the FPPNs and/or based on IVN configuration settings, some received packets may simply be discarded or dropped (as indicated by arrow 266) in the depicted embodiment; as such, the actions taken with respect to a given packet may not necessarily include sending a corresponding packet from the PPS towards a destination. For example, a packet received from a traffic origin may be dropped if a determination is made that the packet is part of a network attack or data exfiltration effort, or if configuration settings of an IVN prohibit packets from that traffic origin to be transmitted to a targeted destination indicated in the received packet, and so on. In various embodiments, the gradual propagation of FPPN configuration information 299 in accordance with CPPs 226 may help avoid workload spikes not just at internal SPPNs 225 of the PPS, but also at external exception path nodes 211.

In some embodiments, a timeout-based cache entry re-validation policy 298 may be employed at the FPPNs 268 to ensure that out-of-date cache entries are not used for processing packets received at the FPPNs. When an entry is stored in a cache 297, a corresponding timeout may be set in such embodiments. When the timeout expires, the FPPN 268 may transmit a re-validation request for the entry to an SPPN 225. If the cache entry remains valid, that is, if the FPPN can continue to use it for additional packets, the SPPN 225 may provide a response indicating that the entry can be retained. If, on the other hand, the entry is no longer valid, the SPPN may inform the FPPN accordingly, and the entry may be removed from the cache 297. In some embodiments, when an SPPN determines that a cache entry is no longer valid, it may provide a replacement entry to the FPPN. In at least one embodiment, an SPPN 225 may have to communicate with an external exception-path node 211 and/or the PPS control plane 214 to verify whether a cache entry remains valid. In some embodiments, other cache invalidation or re-validation schemes may be used. Cell admin agents 271 may monitor the health of the SPPNs and FPPNs in the depicted embodiment and report their findings to the control plane 214, where decisions about provisioning replacement FPPNs or SPPNs may be made based on the findings. As such, the analysis of health status information of the FPPNs may be used at the PPS control plane to determine whether new data plane nodes should be assigned to a given packet processing application instance, whether an existing node should be removed from the set assigned to the given packet processing application instance, and so on.

Example Autonomous Data-Plane Cells

Figure 3:
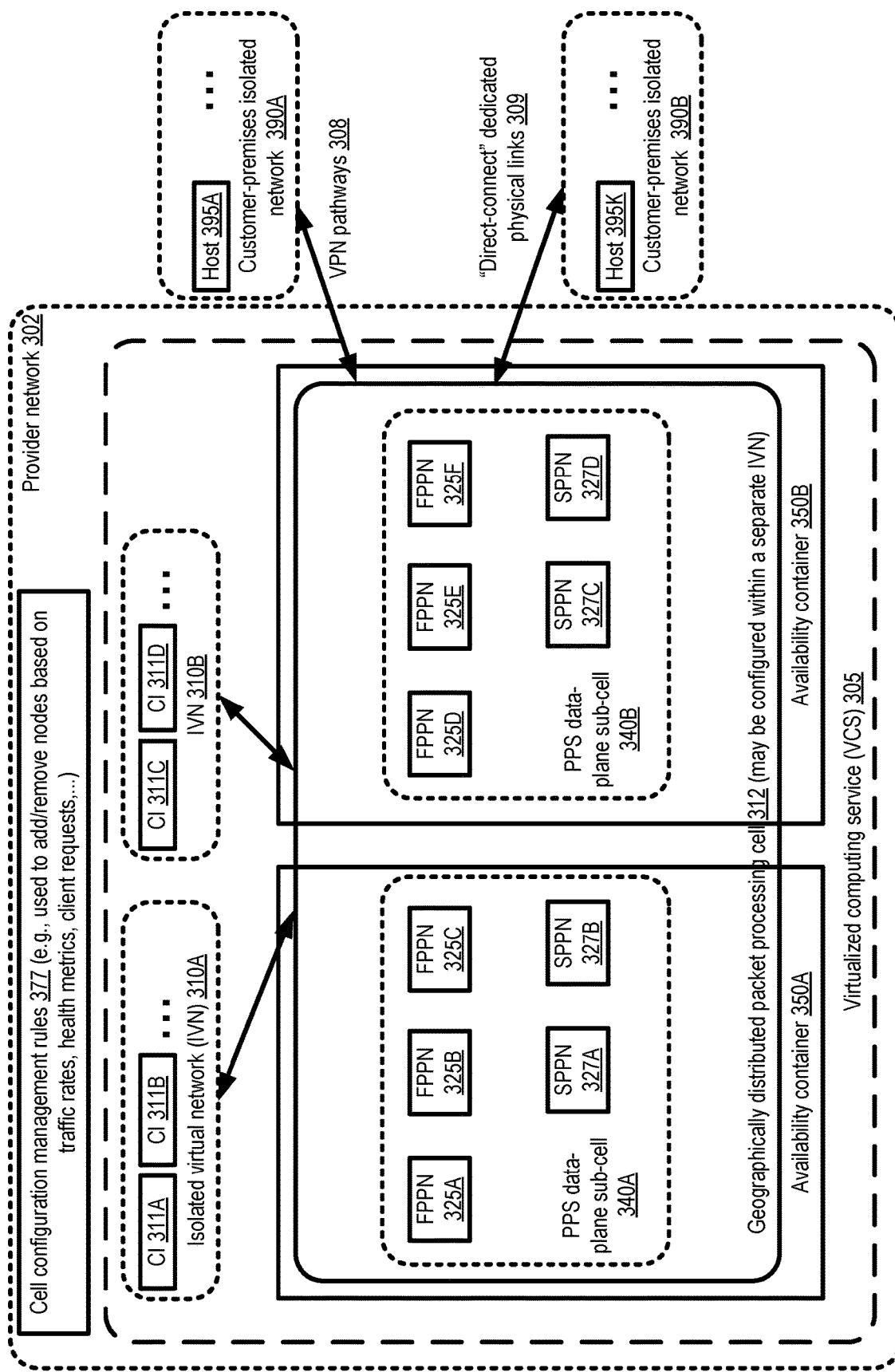
FIG. 3 illustrates an example scenario in which nodes of a packet processing service may be organized as autonomous cells, according to at least some embodiments.

FIG. 3 illustrates an example scenario in which nodes of a packet processing service may be organized as autonomous cells, according to at least some embodiments. In the depicted embodiment, provider network 302 comprises virtualized computing service (VCS) 305 at which isolated virtual networks (IVNs) such as 310A or 310B may be established on behalf of various customers or clients. Processing of packets flowing between compute instances 311 (e.g., CIs 311A and 311B in IVN 310A, and CIs 311C and 311D in IVN 310B), and/or flowing between the compute instances and customer-premises isolated networks 390A or 390B is performed using resources of a geographically distributed PPS cell 312. Cells such as 312 may be referred to as being autonomous for any of several reasons in the depicted embodiment—e.g., any changes to a given cell's internal configuration may be unaffected by, and made independently of, changes to configuration of other cells, traffic of a given instance of a packet processing application may typically be processed using nodes of a single cell, and so on. The control plane of the PPS may assign resources to newly-created cells, and change the configuration of existing cells, in accordance with a set of cell configuration management rules 377 in the depicted embodiment. Such rules may indicate, for example, how to determine the initial numbers of nodes to be assigned to a given cell (e.g., based on the number of CIs whose network packets are to be processed at the cell), the circumstances or conditions for adding nodes to cells or removing nodes from cells (e.g., how changes in workloads of the packet processing applications being handled by a given cell are to be monitored, how cell node health status is to be monitored, how changes in health status and/or workloads are to be mapped to the addition or removal of nodes from the cells, whether requests submitted by clients of the PPS to tune the performance of a packet processing application can trigger cell configuration changes, etc.), and so on. The PPS cell 312 may itself be implemented using VCS resources in the depicted embodiment as discussed below. In some embodiment, the PPS nodes may be configured within one or more separate IVNs (i.e., IVNs dedicated to the PPS, and not to VCS clients whose traffic is to be processed using the PPS).

In at least some embodiments, the resources of the VCS 305, such as the hosts on which various compute instances are run, may be distributed among a plurality of availability containers 350, such as 350A and 350B. Availability containers 350 may also be referred to as availability zones in some embodiments. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container.

In the depicted embodiment, fast-path packet processing nodes (FPPNs) 325 (e.g., 325A, 325B, 325C, 325D, 325E and 325F) as well as slow-path packet processing nodes (SPPNs) 327 (e.g., 327A, 327B, 327C and 327D) may be implemented at least in part using respective compute instances of the VCS 305. The illustrated cell 312 may comprise at least two data-plane sub-cells 340A and 340B, with one data plane sub-cell implemented in each of at least two availability containers 350A and 350B. As a result of the use of multiple availability containers, the probability that the entire cell is affected by any given failure event may be minimized in the depicted embodiment. In some embodiments, PPS control plane components for managing the data plane components may be distributed in a similar manner across multiple availability containers.

As shown, PPS cell 312 may be used for packet processing applications involving traffic between at least four isolated networks—IVNs 310A and 310B, and customer-premises isolated networks 390A and 390B in the depicted embodiment. Isolated network 390A, which may for example be set up at a customer premise or location outside the provider network's own data centers and may include some number of hosts such as host 395A, may communicate with the PPS via a set of virtual private network (VPN) pathways 308 in the depicted embodiment. Isolated network 390B may also be set up at a set of customer premises or locations outside the provider network 302 and may comprise some number of hosts such as host 395K in the depicted embodiment. Traffic between the isolated network 390B and the PPS may flow over a set of dedicated physical links 309 in the depicted embodiment (e.g., instead of a set of links that may be shared with traffic of the public Internet), which may also be referred to as "direct-connect" links. As such, the PPS implemented using the VCS 305 of provider network 302 may be capable of processing packets generated at (or directed towards) a variety of network configurations in the depicted embodiment, including (but not necessarily limited to) isolated virtual networks within the VCS itself, external networks such as 390A which use VPN connections over shared links to communicate with the VCS, and external networks such as 390B which use dedicated links to communicate with the VCS. The PPS may be used to implement the VPN and/or direct-connect functionality in some embodiments. A fleet of edge routing intermediary devices may route packets between the PPS cell and the external networks 390A and 390B, while virtualization management components (VMCs) at the virtualization servers used for CIs 311 may route packets between the CIs and the PPS cell. Other types of networks may also be connected using the PPS in various embodiments. In at least some embodiments, the nodes of the PPS may not utilize the type of multi-availability-container architecture shown in FIG. 3, may use non-virtualized hosts instead of or in addition to virtual machines, and/or may not necessarily use a virtualized computing service or other services of a provider network.

Example Use of Destination Lists and Source Lists

Figure 4:
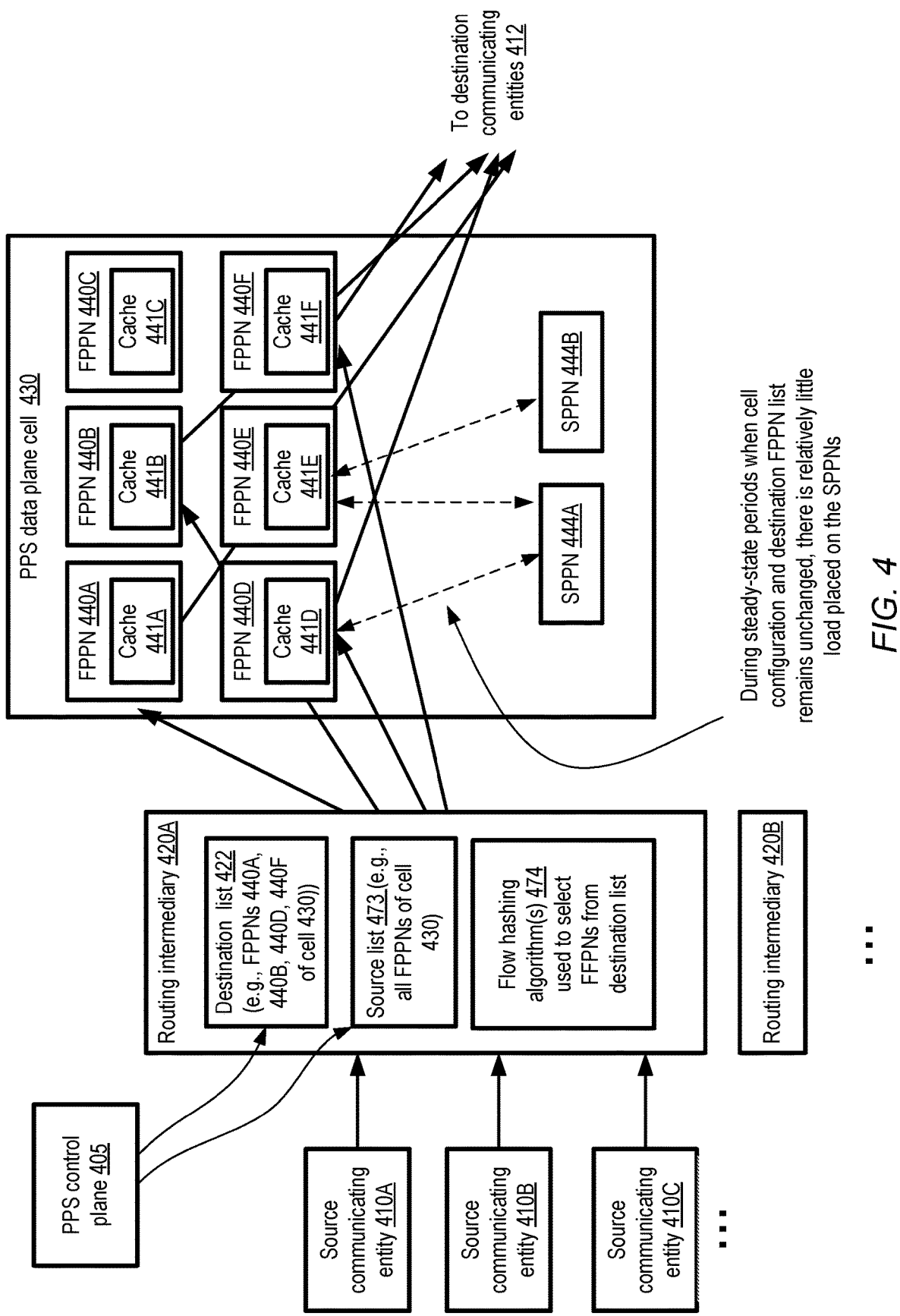
FIG. 4 illustrates an example use of destination lists and source lists at routing intermediaries of packet processing applications, according to at least some embodiments.

FIG. 4 illustrates an example use of destination lists and source lists at routing intermediaries of packet processing applications, according to at least some embodiments. In the depicted embodiment, a PPS data plane cell 430 has been selected for an instance of a packet processing application to be implemented on packets being transmitted between a set of source communicating entities 410 (e.g., 410A-410C) and a set of destination communicating entities 412. The PPS control plane 405 may assign the cell 430 to the application instance, and provide configuration information in the form of a destination list 422 and a source list 473 to each of several routing intermediaries 420 (e.g., 420A or 420B). A destination list 422 may indicate some subset (or all) of the FPPNs 440 of the cell 430 to which the routing intermediary 420 is to direct packets originating at source communicating entities 410 in the depicted embodiment. Similarly, a source list 473 may indicate some subset (or all) of the FPPNs of the cell 430 from which the routing intermediary 420 is to receive packets directed to source communicating entities 410 in the depicted embodiment. Any of a number of different criteria may be used to determine which specific FPPNs are to be included in a destination list 422 or a source list 473 in different embodiments. FPPNs may be selected for inclusion in a destination list 422, for example, based on a mapping from some combination of properties of the packet processing application instance to FPPN identifiers, based on the health status of the FPPNs, based on physical or network proximity to the source communicating entities 410, based on current traffic conditions in various parts of the network, and/or other criteria in different embodiments. Destination list sizes may differ from one packet processing application to another in some embodiments, and/or from one routing intermediary to another. For example, some routing intermediaries may have sufficient processing power to route more packets per second than others, and larger destination lists may be provided to such higher-performance intermediaries than to other intermediaries.

When a packet originating at a source communicating entity 410 is received at the routing intermediary 420, one or more flow hashing algorithms 474 may be used by the routing intermediary to select the particular FPPN 440 to which that packet (and other packets of the same flow) are to be directed. In the depicted scenario, destination list 422 includes FPPNs 440A, 440B, 440D and 440F, while source list 473 includes all the FPPNs 440A-440F of the cell 430. In some embodiments, all the routing intermediaries 420 may be provided identical destination lists and identical source lists. In other embodiments, the destination lists and/or the source lists assigned and provided by the PPS control plane 405 may differ from one routing intermediary to another. In some embodiments, edge routing intermediaries, which are responsible for traffic flowing between the PPS and devices of the public Internet and other networks external to the provider network, may be assigned larger destination lists (e.g., the entire set of FPPNs of the cell 430) than on-host routing intermediaries such as the VMCs discussed earlier. In some embodiments, respective network addresses of the FPPNs (e.g., network addresses of virtual network interfaces assigned/attached to the FPPNs) and/or the identifiers of the cells 430 to which the FPPNs belong may be stored in destination lists and/or source lists. In at least some embodiments, data structures other than lists may be used to store metadata at a given FPPN about the group of FPPNs to which that FPPN is to direct packets, and/or data structures other than lists may be used to store metadata about the group of FPPNs from which that FPPN is to receive packets. As such, destination lists may also be referred to as destination groups, and source lists may also be referred to as source groups.

The PPS data plane cell 430 may also comprise a set of slower-path packet processing nodes (SPPNs) such as 444A and 444B in the depicted embodiment. When an FPPN is unable to find the rules or executable code to be used to perform packet processing on a given flow in its cache 441 (e.g., cache 441A-441F), as discussed above, the FPPN 441 may send a cache miss indication to a selected SPPN 444, and the SPPN 444 may be responsible for providing the appropriate rules/code for that packet flow to the FPPN. Cache misses may occur at a given FPPN 440, for example, the first time a packet of a given flow is encountered at that FPPN, or the first time that a packet of a given flow is encountered after a previously-stored cache entry for that flow is removed/replaced from the cache of the FPPN. During steady state periods, when the configuration of cell 430 and the destination lists doesn't change, relatively little load may be places on the SPPNs, as indicated by the dashed arrows between the FPPNs and the SPPNs in FIG. 4. As a result of the light load during steady state, a relatively small number of SPPNs 444 may be instantiated in a given cell 430 in some embodiments relative to the number of FPPNs 440. However, the workload at the SPPNs (and the control plane) may change if/when new FPPNs are added or existing FPPNs are removed from a given cell.

Figure 5:
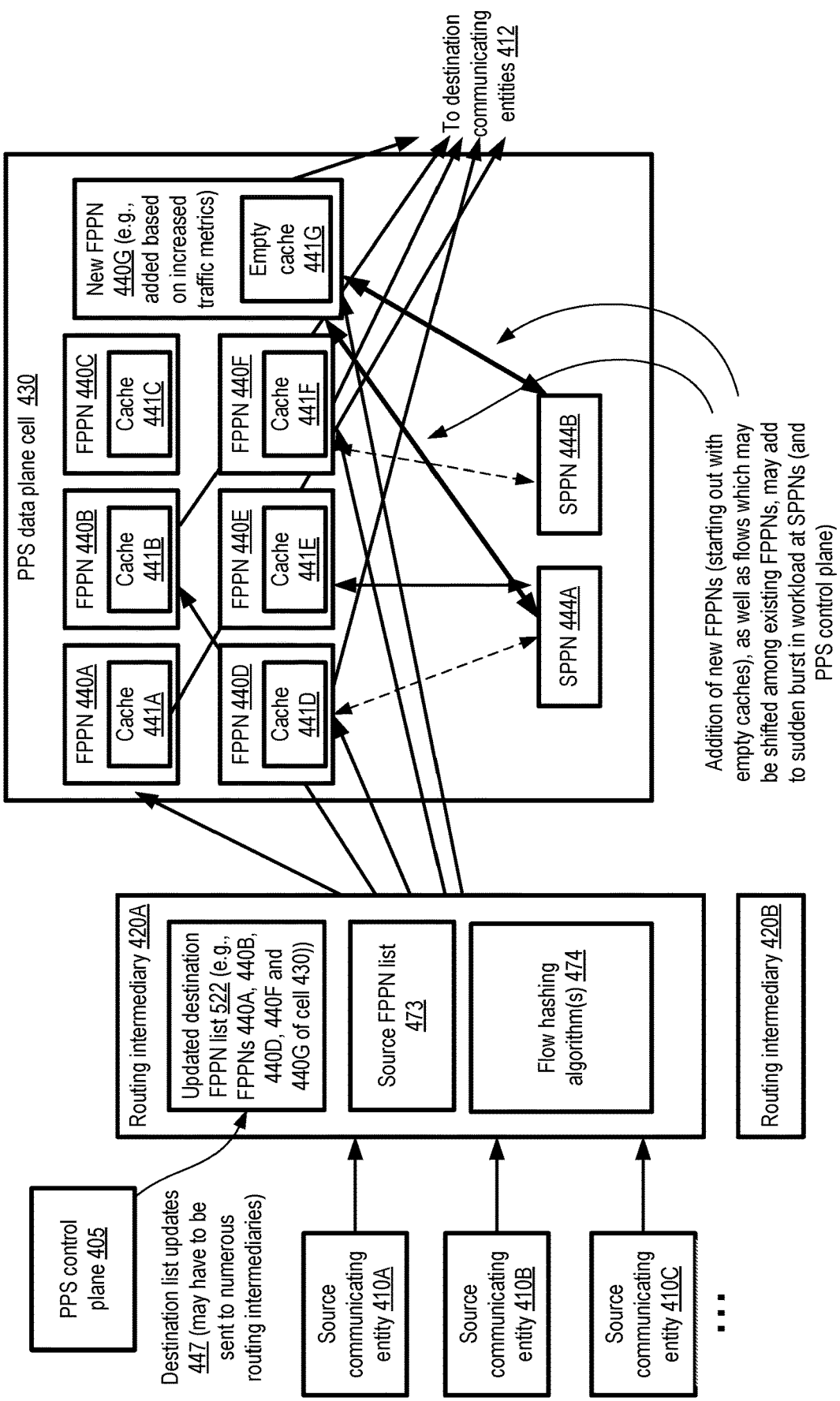
FIG. 5 illustrates an example impact of adding a fast-path packet processing node to a destination list, according to at least some embodiments.

FIG. 5 illustrates an example impact of adding a fast-path packet processing node to a destination list, according to at least some embodiments. In the example scenario shown in FIG. 5, a new FPPN 440G has been added to the PPS data plane cell 430 of FIG. 4, and the destination (and source) lists of the routing intermediaries are to be updated to include the new FPPN. Destination list update requests/ commands 447 may have to be sent to numerous (e.g., hundreds or thousands) of routing intermediaries 420 in the depicted embodiment from the PPS control plane 405. If the control plane 405 is required to send all the update messages immediately (or as soon as possible), this may cause a spike in the workload of the control plane itself.

Furthermore, because of the way in which flow hashing algorithms 474 work, incorporating the new FPPN 440G into the destination list 522 may cause a non-trivial increase in the number of cache miss requests that various SPPNs 444 may have to process. Some packet flows (which were directed earlier to another FPPN of the destination list) may now be directed to the new FPPN 440G, whose cache 441G is initially empty; until its cache reaches a steady state, FPPN 440G may continue to send cache miss messages to the SPPNs. Furthermore, depending on the specifics of the flow hashing algorithms, in at least some embodiments it may also be the case that the mappings between packet flows and pre-existing FPPNs of the destination list may also change in the depicted embodiment. For example, it may be the case that a particular flow F1 was originally mapped to FPPN 440B, but as a result of the modification of the destination list, flow F1 is now being mapped to FPPN 440D, thus causing cache misses at FPPN 440D. Such shifts may also increase the workload of the SPPNs 444 temporarily in the scenario where FPPN 440G is added to destination lists. Depending on the number of routing intermediaries 420 whose destination lists have to now accommodate FPPN 440G, the cumulative increase in the workload of the SPPNs may be quite large in some embodiments if all the destination lists are updated near-concurrently.

FIG. 6 illustrates example graphs showing possible propagation rates of configuration changes of a packet processing service, according to at least some embodiments. In scenario 601A, the destination lists at all the routing intermediaries being used for a packet processing application instance are updated rapidly, within t1 seconds of the time 620 at which the information about the configuration change is provided to a first routing intermediary of the application instance. The fraction 602 of routing intermediaries to which the configuration change information is provided rises rapidly to 100, leading to undesired load spikes at SPPNs and the PPS control plane itself.

In scenario 601B, a more gradual approach towards configuration change information propagation is implemented in the depicted embodiment. An update propagation interval t2 is selected, during which changes to individual destination lists are applied gradually, e.g., choosing the timing of the update using a pseudo-random number based algorithm. Vertical segments of the solid line 630 correspond to times at which the destination lists at one or more of the routing intermediaries are updated, while horizontal segments indicate periods in which none of the destination lists are updated. In the earlier portions of the time interval t2, most of the routing intermediaries continue to use their un-updated destination lists, so their outbound traffic patterns continue as before the configuration change. In later portions of the interval, more and more of the routing intermediaries use the new configuration information, thus spreading its impact over the interval. As a result of the gradual dissemination of the configuration change information, load spikes at SPPNs and the PPS control plane may be avoided in embodiments in which the approach shown in Scenario 601B is used.

Example PPS Configuration Change Management Techniques

Figure 7:
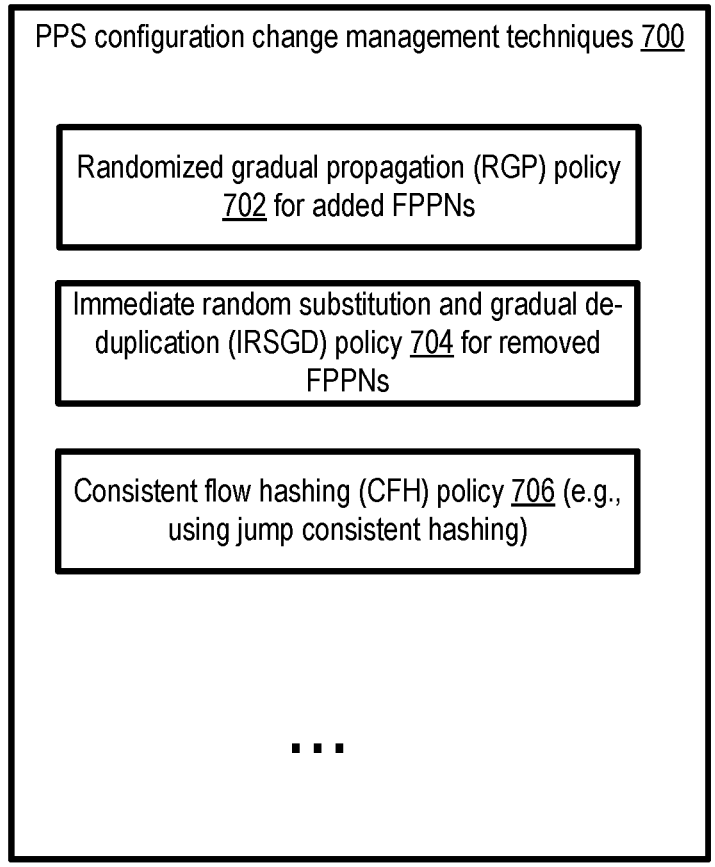
FIG. 7 illustrates example techniques which may be employed, singly or in combination, for reducing the impact of packet processing service configuration changes, according to at least some embodiments.

FIG. 7 illustrates example techniques which may be employed, singly or in combination, for reducing the impact of packet processing service configuration changes, according to at least some embodiments. Such techniques 700 may include a randomized gradual propagation (RGP) policy 702 for scenarios in which FPPNs are added to the set of FPPNs assigned to an instance of a packet processing application, an immediate random substitution and gradual de-duplication (IRSGD) policy 704 for scenarios in which FPPNs are removed, and/or a consistent flow hashing policy 706 in the depicted embodiment.

According to the RGP policy 702, an update propagation interval may be selected for some or all of the routing intermediaries whose destination lists are to be modified by including an additional FPPN assigned by a PPS control plane. Note that different update propagation intervals may be selected for different packet processing application instances in some embodiments, e.g., based on the total number of source/destination communicating entities of the instances, the number of routing intermediaries configured for the application instances, the total number of FPPNs and/or SPPNs assigned to the application instances, etc. At respective points in time within the update propagation interval, selected using one or more pseudo-random number based algorithms, the network address of the additional FPPN may be added a particular routing intermediary's destination list in various embodiments. In some embodiments, the network address of the new FPPN, as well as the update propagation interval, may be provided to all the routing intermediaries shortly after the new FPPN is brought online by the PPS control plane, and each of the routing intermediaries may then use the pseudo-random number based algorithms to choose exactly when their destination lists are updated by including the network address. In other embodiments, the PPS control plane may spread out the points in time (e.g., using the pseudo-random number based algorithm) at which each of the routing intermediaries is informed regarding the new FPPN. In some embodiments, the sequence in which different routing intermediaries are informed about the new FPPN (and their respective destination lists are updated) may be determined by the PPS control plane using pseudo-random numbers. A similar approach may be taken to updating source lists in some embodiments, while in other embodiments source lists may be updated as soon as possible. In at least one embodiment, the PPS control plane may not use randomization; instead, the destination lists of the set of routing intermediaries configured for a given packet processing application instance may be updated in a deterministic order based on the network addresses or names of the routing intermediaries.

In scenarios in which an FPPN is to be removed from a destination list, e.g., because of a failure at the FPPN or a scheduled update of the FPPN's software, firmware or hardware, in at least some embodiments the PPS control plane may notify individual ones of the routing intermediaries about the removal as soon as possible. In accordance with the IRSGD policy 704, each of the routing intermediaries may choose (e.g., using a pseudo-random number based algorithm) some other FPPN from its destination list, and replace the entry of the to-be-removed FPPN by a duplicate entry representing the randomly-chosen FPPN. This duplication may cause a slight increase in the workload of the chosen FPPN (and some SPPNs) in at least some embodiments, as packet flows which were earlier being sent to the to-be-removed FPPN may now be sent to the chosen substitute. However, in various embodiments, the number of routing intermediaries may typically be large enough that the randomized selection of the substitutes may spread the increase in workload approximately uniformly among numerous FPPNs of the destination lists. Later, in accordance with the IRSGD, e.g., at random points in time during a de-duplication interval selected by the PPS control plane, the destination lists to which duplicate entries were added as a result of FPPN removal may be de-duplicated. The de-duplications may be made gradual using a similar approach as that discussed above for gradually adding new FPPN entries in various embodiments—e.g., the times at which respective destination lists are de-duplicated within the interval may be chosen using pseudo-random numbers either by the PPS control plane or by the routing intermediaries, and/or the sequence in which the destination lists are de-duplicated may be selected using pseudo-random numbers etc. In some embodiments, source lists of FPPNs may also be updated gradually when an FPPN is to be removed; in other embodiments, the source lists may be updated to reflect an FPPN removal as soon as possible.

In some embodiments, instead or in addition to using the RGP policy or the IRSGD policy, a consistent flow hashing (CFH) policy 706 (e.g., using jump consistent hashing) may be employed at a PPS. In scenarios in which CFH techniques are employed, special hash functions may be used to map packet flows to individual FPPNs of a destination list, such that the fraction of flows whose destination is changed as a result of the addition or removal of a given FPPN from the destination list remains small.

Example Types of Packet Processing Applications

Figure 8:
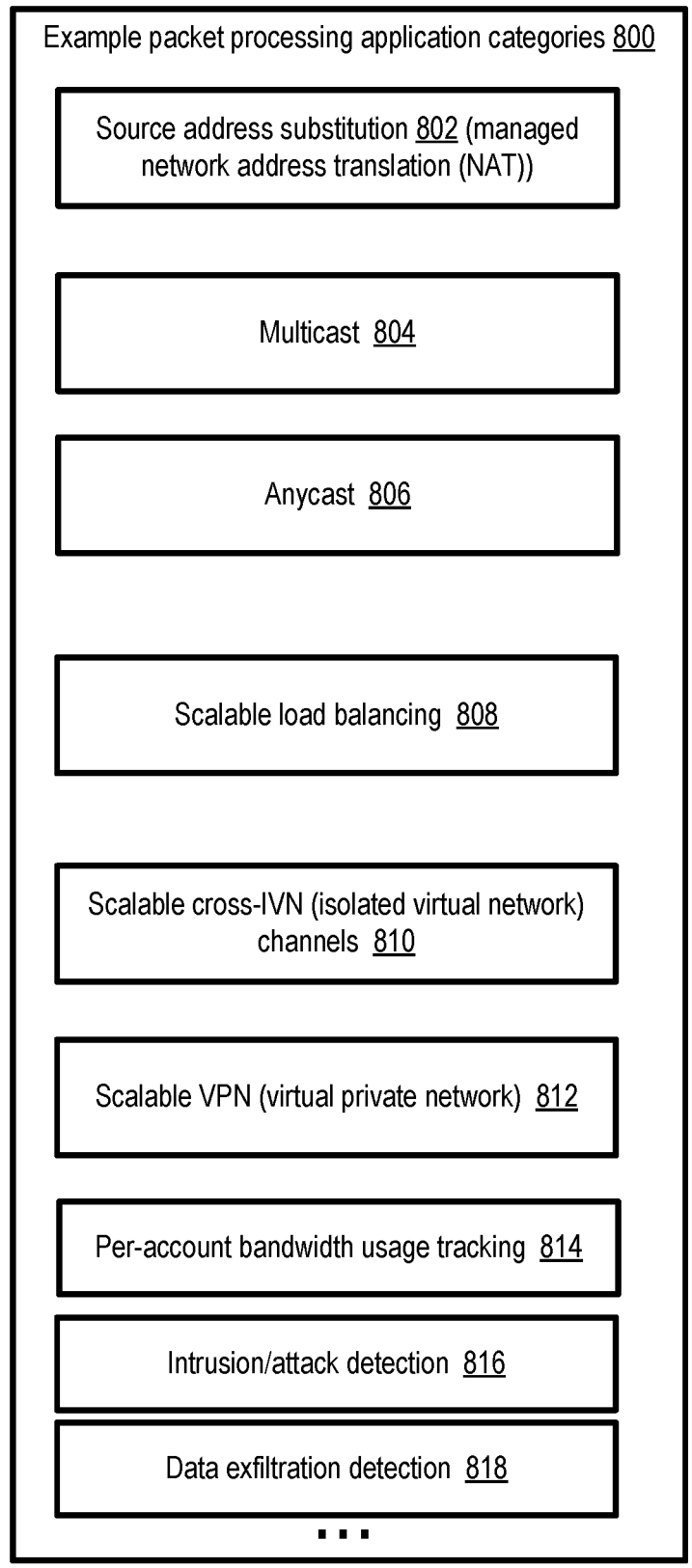
FIG. 8 illustrates example types of applications which may be implemented using a packet processing application, according to at least some embodiments.

FIG. 8 illustrates example types of applications which may be implemented using a packet processing application, according to at least some embodiments. In general, a PPS with capabilities similar to that of the PPS 102 shown in FIG. 1 may be configurable to implement any desired category 800 of packet processing or transformations (or combinations of different types of packet processing or transformations), with nodes being assignable dynamically to support a large range of traffic rates in a transparent and scalable manner. Generally speaking, packet processing applications may be distinguished from one another based on the packet processing rules or logic used and the owners/vendors of the applications in various embodiments, while individual instances of the packet processing applications may be distinguished from one another based on the specific sets of communicating entities whose packets are processed and/or on the sets of PPS data plane nodes configured for processing the packets. Instances of packet processing applications may also be referred to as virtual packet processing appliances in some embodiments.

Source address substitution applications 802, as the name suggests, may involve replacing, for the packets of a particular flow, the source address and port in a consistent manner. (As mentioned earlier, packet flows may be distinguished from one another in some embodiments based on a combination or tuple of properties such as the network protocol being used, the source and destination network address, the source and destination ports, a virtual network interface identifier, and/or other factors.) Source address substitution techniques may be useful, for example, when an overlap exists between the private address ranges of two or more isolated networks, or when the actual addresses of one or more servers implementing a service using a load balancer are to be hidden from service consumers, and the PPS may be employed as the intermediary responsible for such substitutions in some embodiments. Such address substitution operations may also be referred to as "managed network address translation (NAT)" in some embodiments. Multicast 804 is a networking technique, implementable using an SPPS in some embodiments, in which contents (e.g., the body) of a single packet sent from a source are replicated to multiple destinations of a specified multicast group. In contrast, anycast 806 may involve selecting, for all the packets of a given flow that are received at a PPS, a particular destination from among a specified set of destinations.

Scalable load balancing 808, as indicated by the name, involves distributing packets among a set of servers so as to prevent overloading of individual ones of the servers. For scalable cross-IVN channels 810, the PPS may in effect be used as an intermediary between the private address spaces of two or more different IVNs in some embodiments. In at least one embodiment, a PPS may also or instead be used to support scalable VPN connectivity 812 between some set of resources within a provider network and one or more client networks or client premises outside the provider network, or between multiple client-premises networks each linked via VPN connections to the PPS. In some embodiments, a provider network may support connectivity with external networks via dedicated physical links called "direct connect" links as discussed earlier, and the traffic between such external networks (and between such external networks and IVNs or VPN-connected external networks) may be managed using the PPS.

In one embodiment, a PPS may be employed for per-account bandwidth usage tracking 814, e.g., by a telecommunications service provider. In at least some embodiments, the PPS may be used for intrusion or attack detection 816 (e.g., for detection of unexpected or unwanted traffic at resources of a particular business or governmental entity). Data exfiltration detection 818 (e.g., the detection of undesired/unauthorized transmission of data out of a network of an organization) may be performed using a PPS in some embodiments. Note that at least in some embodiments, a single instance of a packet processing application pipeline set up at a PPS may combine several of the packet processing functions indicated in FIG. 8 (and/or other packet processing techniques). Other categories of packet processing applications may be supported using the PPS in different embodiments, while some of the types of applications indicated in FIG. 8 may not be supported in some embodiments.

Methods for Managing PPS Configuration Changes

FIG. 9 is a flow diagram illustrating aspects of operations that may be performed to reduce the impact of configuration changes at a packet processing service, according to at least some embodiments. As shown in element 901, a plurality of data plane cells of a PPS of a provider network may be configured, with individual cells comprising a collection of FPPNs and SPPNs. The SPPNs may also be referred to as exception-path packet processing nodes. The FPPNs may be used to implement instances of packet processing applications, indicated by clients of the PPS, efficiently in various embodiments. Each packet processing application (such as applications implementing NAT, load balancing, cross-IVN traffic routing, and other types of applications discussed in the context of FIG. 8) may comprise a pipeline with one or more stages in the depicted embodiment, with an individual stage in turn comprising one or more packet processing rules or actions. The rules and/or actions may be implemented, for example, using eBPF programs or functions that can be executed easily and rapidly on resource-constrained devices in some embodiments.

A request to set up an instance of an application for traffic of specified collections of computing entities may be received (element 904). The computing entities may, for example, include some number of compute instances of a VCS of the provider network and/or hosts/devices located outside the data centers of the provider network in various embodiments. Packets generated at (or sent to) the computing entities may in at least some cases be transmitted to (or received from) the PPS via routing intermediaries. Examples of such routing intermediaries may include, among others, virtualization management components of VCS virtualization servers (in the case of compute instances), edge devices of the VCS (in the case of hosts/devices located outside the provider network), and so on.

Control-plane or administrative components of the PPS may assign a particular data plane cell to the packet processing application instance in the depicted embodiment (element 907). The control plane may also provide initial destination lists and/or source lists to the routing intermediaries of the application instance in various embodiments (element 913). A destination list may indicate the set of FPPNs (a subset of the cell's FPPNs, or all of the cell's FPPNs) to which an individual routing intermediary can send packets (e.g., after selecting the specific FPPN using flow hashing), while a source lost may indicate the set of FPPNs (a subset or all of the cell's FPPNs) which are configured to send packets to the routing intermediary. A number of criteria (e.g., FPPN health status information, proximity to the communicating entities of the application, etc.) may be used to identify the specific FPPNs to be included in the initial destination lists and source lists in some embodiments, as discussed earlier.

Based on various types of triggering conditions or criteria, the PPS control plane may determine that the memberships of the destination lists and/or source lists of at least some routing intermediaries are to be changed (element 916) in some embodiments. Such changes may be required if, for example, new FPPNs have to be added in response to increasing levels of traffic, changes in health status of FPPNs, updates to routers, changing network conditions, and so on.

In the embodiment depicted in FIG. 9, instead of updating all the destination lists and/or source lists immediately or within a very short time interval, a more gradual approach may be taken (element 919). According to a gradual change propagation policy, some routing intermediaries' lists may be updated before others over a selected update propagation interval (e.g., tens of seconds), so that the sudden propagation of the configuration changes does not cause undesired workload bursts or spikes at the SPPNs and/or the control plane itself. As a result, the number of packet flows which is directed to any given FPPN (including the new FPPN in the case of an addition of an FPPN), and the rate at which cache misses are processed at the SPPNs, may change relatively slowly, avoiding large swings in the performance experienced at the communicating entities of the application instance.

FIG. 10a and FIG. 10b are flow diagrams illustrating example techniques which may be employed in response to additions and deletions, respectively, of entries of destination lists pertaining to a packet processing application, according to at least some embodiments. As shown in element 1001 of FIG. 10a, a determination may be made at resources of a PPS control plane that a new FPPN, FPPN-A, is to be added to the destination lists of N routing intermediaries configured for a packet processing application.

The control plane resources may determine a gradual-update-propagation interval GI-A for the addition of the FPPN-A in the depicted embodiment (element 1004). The update propagation intervals chosen may vary for different packet processing application instances in some embodiments, e.g., based on the number of communicating entities of the application instance, the number of routing intermediaries, and/or the number of FPPNs assigned to the application instance.

Using a pseudo-random number based technique, at N points in time within GI-A, a respective routing intermediary may be caused to include FPPN-A in its destination list in the depicted embodiment (element 1007). The order in which the different routing intermediaries modify their destination lists may also be chosen using pseudo-random numbers in at least some embodiments.

As shown in element 1051 of FIG. 10*b*, a determination may be made at a PPS control plane that an existing FPPN, FPPN-B, is to be removed from the destination lists of N routing intermediaries set up for an instance of a packet processing application. The control plane may cause each of the N routing intermediaries to replace FPPN-B by a respective other FPPN, FPPN-X, of that routing intermediary's current destination list in the depicted embodiment (element 1054). A pseudo-random number based technique may be used to select the replacement FPPN in at least some embodiments; as a result, the duplicated entry of the destination list may in most cases differ from one routing intermediary to another.

A gradual deduplication interval GDI-A may be determined by the PPS control plane (element 1057) in the depicted embodiment for the removal of the duplicate entries which were introduced in operations corresponding to element 1054. The gradual de-duplication interval chosen by the control plane may vary from one application instance to another in some embodiments, e.g., e.g., based on the number of communicating entities, the number of routing intermediaries, and/or the number of FPPNs assigned to the application instance.

Using a pseudo-random number based technique, at N points in time within GDI-A, a respective routing intermediary may be caused to remove duplicate entries from its destination list in the depicted embodiment (element 1060). The order in which the different routing intermediaries de-duplicate their destination lists may also be chosen using pseudo-random numbers in at least some embodiments.

It is noted that in various embodiments, some of the operations shown in FIG. 9, FIG. 10*a* and/or FIG. 10*b* may be implemented in a different order than that shown in the figure, or may be performed in parallel rather than sequentially. Additionally, some of the operations shown in FIG. 9, FIG. 10*a* or FIG. 10*b* may not be required in one or more implementations.

Cell-to-Cell Migration

In some embodiments, for workload re-balancing or other reasons, control plane resources of a PPS may determine the traffic of an application for which a particular data plane cell was being used for packet processing is to be migrated to a different data plane cell. For example, a first set of packet processing nodes (which may include FPPNs and SPPNs) of a cell C1 may have been used for packets transmitted between communicating entities of an application App1 via a set of routing intermediaries for some time period, and a decision may be made that a second set of packet processing nodes of a different cell C2 is to be used going forward for App1's packets. A gradual, multi-phase cell-to-cell migration procedure may be implemented by the PPS control plane in at least some embodiments, which also avoids abrupt transitions in a manner similar to the way that the techniques described earlier avoid abrupt workload changes when a new FPPN is to be added to or removed from a destination list.

In at least one embodiment in which the multi-phase cell-to-cell migration is implemented, each affected routing intermediary (RI) may be provided two cell identifiers by the control plane as part of the configuration information used to select destination FPPNs for packets sent from RI, and to verify that packets received at the routing intermediary are from source FPPNs which have been designated for the routing intermediary. The first cell whose identifier is provided may be referred to as a source-and-destination-cell (SDC), and the second cell may be referred to as a source-cell (SC). When selecting a destination FPPN for a packet, the RI may choose from nodes of the SDC (e.g., using flow hashing as mentioned earlier) in such embodiments. When checking whether a packet was received from a valid source at the RI, the RI may check that the packet was sent from an FPPN in either the SDC or the SC (that is, if a packet is received at an RI from an FPPN which is not in the SDC and also not in the SC, the packet may be rejected; otherwise, the packet may be accepted).

Consider an example scenario in which the traffic of an application, handled by a plurality of routing intermediaries {RI-Set}, is to be migrated from cell C1 to cell C2. Prior to the initiation of the migration, for each of the RIs of the {RI-Set}, SDC=C1, and SC=C1. In a first phase of the migration, in at least some embodiments the PPS control plane may sent a first set of configuration messages to members of {RI-Set}, indicating that C2 has been selected as a source of packets for the particular traffic intermediary, while C1 cell still remains selected as a source and a destination of packets. Thus, the first cell migration configuration propagation message may indicate (SDC=C1, SC=C2). The control plane messages in each phase of the cell-to-cell migration may be sent/received over some period of time, so that different RIs of {RI-Set} may have different views regarding their SDC and SC at a given point in time.

The control plane may wait until it receives implicit or explicit indications from all the RIs of {RI-Set} that they have received the first-phase messages setting SC to C2 (and hence the first phase is complete) before initiating the second phase of the migration in various embodiments. In the second phase, a respective message may be sent to each of the RIs from the control plane, indicating (SDC=C2, SC=C1)—that is, that the second cell (C2) is now also designated as a destination for packets from the RI. These configuration changes indicated in the second phase may be propagated gradually in at least some embodiments (e.g., using pseudo-random numbers as discussed earlier), as the destination lists of the RIs are in effect being changed. After the messages of the second phase are received, it may still be the case that some packets continue to be received at the RIs of {RI-Set} from C1; however, gradually, as more and more of the application's packets are sent to C2 by the RIs, the incoming traffic from C1 may converge to zero. Eventually, after the PPS control plane has received confirmation that the application's packets are no longer being sent using C1 (e.g., based on metrics collected with respect to virtual network interfaces being used for the application), a third set of messages indicating that (SDC=C2, SC=C2) may be sent to all the RIs of {M-Set}, thus completing the multi-phase cell-to-cell migration procedure. In some embodiments, variations of this migration procedure may be implemented when a transition from one cell to another is desired—e.g., information indicating that C2 is going to be designated by a particular target time as both the source and destination cell may be sent to all the RIs, and individual RIs may choose, using pseudo-random numbers, when (before the target time) they start sending packets to C2 instead of C1.

Illustrative Computer System

Figure 11:
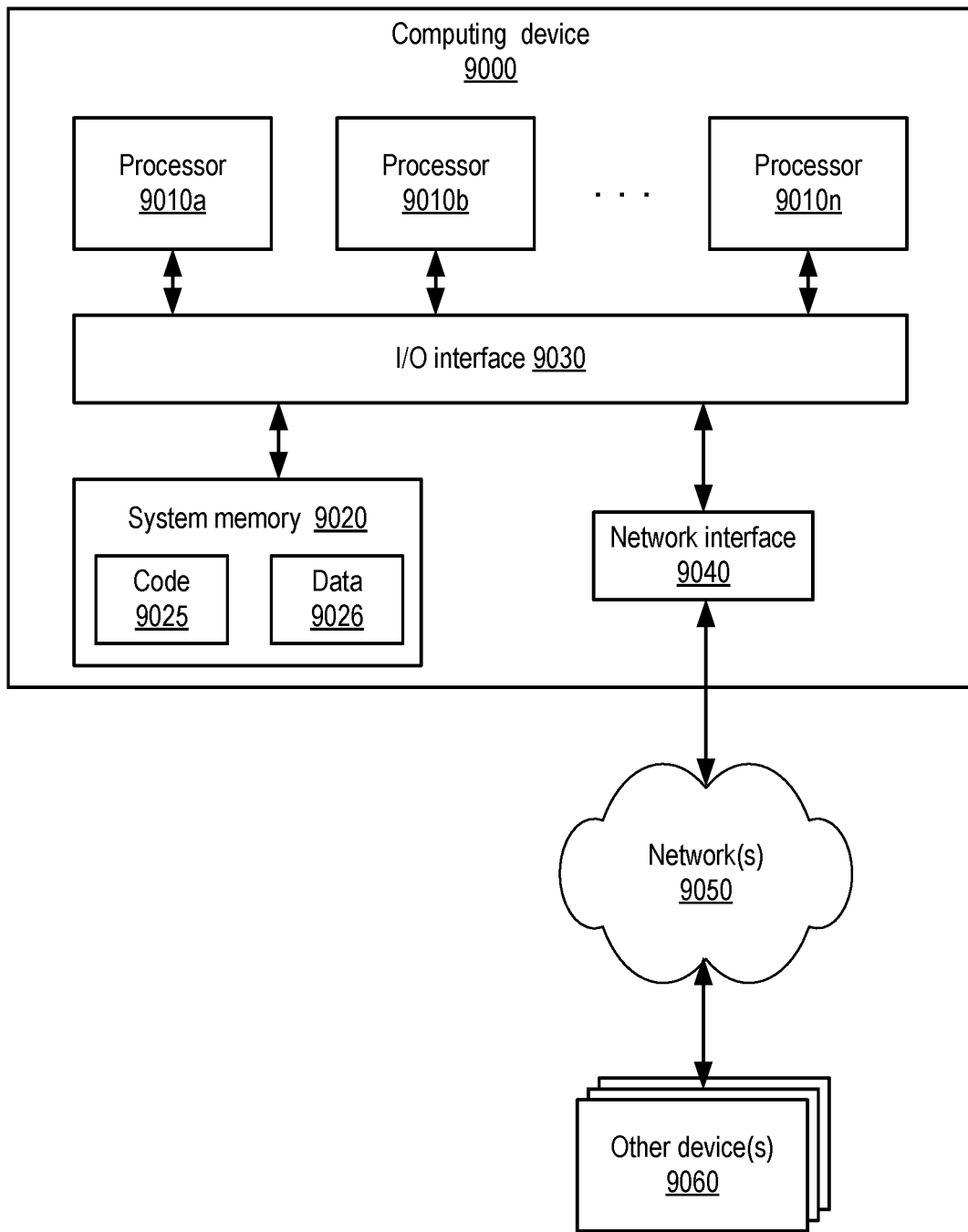
FIG. 11 is a block diagram illustrating an example computing device that may be used in at least some embodiments.

In at least some embodiments, a server that implements the techniques described herein (e.g., including control plane and data plane components of a packet processing service, routing intermediaries configured for packet processing application, and/or communicating entities whose packets are processed at the packet processing service), may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and/or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10b, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 10b. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices cause the one or more computing devices to:
  establish, by one or more control plane resources of a packet processing service of a provider network, a plurality of data plane cells of the packet processing service, wherein a data plane cell of the plurality of data plane cells comprises a first collection of fast-path packet processing nodes and a second collection of exception-path packet processing nodes, wherein a fast-path packet processing node of the first collection is configured to implement respective packet processing rules on packet flows of one or more packet processing applications, wherein the respective packet processing rules are obtained at the fast-path packet processing node from one or more of the exception-path packet processing nodes of the second collection;
  assign, by the one or more control plane resources, a particular data plane cell of the plurality of data plane cells to process packets flowing between a first set of communicating entities and a second set of communicating entities of a first packet processing application, wherein at least one communicating entity of the first set comprises a compute instance of a virtualized computing service of the provider network;
  provide, by the one or more control plane resources to individual ones of a plurality of routing intermediaries associated with the first packet processing application, a respective destination list assigned to the routing intermediary, wherein, with respect to a particular routing intermediary, the destination list indicates one or more fast-path packet processing nodes of the particular data plane cell, and wherein the particular routing intermediary is configured to transmit a packet originating at a communicating entity of the first set to a fast-path packet processing node of the destination list for implementation of a packet processing rule of the first packet processing application;
  determine, by the one or more control plane resources, that an additional fast-path packet processing node of the particular data plane cell is to be included in the destination lists of the plurality of routing intermediaries;
  identify, by the one or more control plane resources, a first gradual-update-propagation interval; and
  cause, by the one or more control plane resources, the destination lists of the plurality of routing intermediaries to be updated to include the additional fast-path packet processing node such that:
    (a) during an initial portion of the first gradual-update-propagation interval selected for the first packet processing application, the number of routing intermediaries whose destination lists are updated is smaller than the number of routing intermediaries whose destination lists have not been updated, and a first group of packet flows is directed to the additional fast-path packet processing node, and
    (b) during a subsequent portion of the first gradual-update-propagation interval, the number of routing intermediaries whose destination lists have been updated is greater than the number of routing intermediaries whose destination lists have not been updated, and a second group of packet flows is directed to the additional fast-path packet processing node, wherein the second group is larger than the first group.

2. The system as recited in claim 1, wherein a time at which a destination list a particular routing intermediary is updated during the first gradual-update-propagation interval is selected using a pseudo-random number.

3. The system as recited in claim 1, wherein a sequence in which the destination lists of the plurality of routing intermediaries is updated is determined at least in part using a pseudo-random number based algorithm.

4. The system as recited in claim 1, wherein the one or more computing devices include further instructions that upon execution on or across the one or more computing devices further cause the one or more computing devices to:
  select the first gradual-update-propagation interval based at least in part on a size of the first set of communicating entities of the first packet processing application; and
  select a second gradual-update-propagation interval for propagating changes to destination lists at one or more routing intermediaries associated with a second packet processing application, wherein the second gradual-update-propagation interval differs from the first gradual-update-propagation interval.

5. The system as recited in claim 1, wherein a first destination list provided by the one or more control plane resources to a first routing intermediary of the plurality of routing intermediaries is larger than a second destination list provided by the one or more control-plane resources to a second routing intermediary of the plurality of routing intermediaries.

6. A computer-implemented method, comprising:
providing, to individual ones of a plurality of routing intermediaries associated with a packet processing application for packets transmitted between a first collection of communicating devices and a second collection of communicating devices, an indication of a respective destination group assigned to the routing intermediary, wherein, with respect to a particular routing intermediary, the destination group indicates a set of fast-path packet processing nodes of a packet processing service, and wherein the particular routing intermediary is configured to transmit packets originating at a communicating device of the first collection to a fast-path packet processing node of the destination group for implementation of a packet processing rule of the packet processing application;

determining that the set of fast-path processing nodes to be included in the destination groups of the plurality of routing intermediaries has changed; and causing the destination groups of the plurality of routing intermediaries to be updated such that
  (a) during an initial portion of a gradual-update-propagation interval, the number of routing intermediaries whose destination groups are updated to reflect the change in the set of the fast-path packet processing nodes is smaller than the number of routing intermediaries whose destination groups have not been updated, and
  (b) during a subsequent portion of the gradual-update-propagation interval, the number of routing intermediaries whose destination groups have been updated to reflect the change in the set of the fast-path packet processing nodes is greater than the number of routing intermediaries whose destination groups have not been updated.

7. The computer-implemented method as recited in claim 6, wherein said causing the destination groups of the plurality of routing intermediaries to be updated comprises causing a pseudo-random number based algorithm to be used to select a time during the gradual-update-propagation interval at which the destination group of a particular routing intermediary is modified.

8. The computer-implemented method as recited in claim 6, wherein said causing the destination groups of the plurality of routing intermediaries to be updated comprises causing a pseudo-random number based algorithm to be used to determine a sequence in which the respective destination groups of individual ones of the plurality of routing intermediaries are updated.

9. The computer-implemented method as recited in claim 6, further comprising:
  establishing, based at least in part on an analysis of packet arrival rates of the packet processing application, an additional fast-path packet processing node at the packet processing service, wherein the additional fast-path packet processing node is added to the destination group of a particular routing intermediary of the plurality of routing intermediaries in the gradual-update-propagation interval.

10. The computer-implemented method as recited in claim 6, further comprising:
  causing, based at least in part on a determination that a particular fast-path packet processing node is no longer to be used for the packet processing application, a first entry indicating the particular fast-path packet processing node in a destination group of a particular routing intermediary to be replaced by a second entry of the destination group.

11. The computer-implemented method as recited in claim 6, wherein said causing the destination groups of the plurality of routing intermediaries to be updated comprises causing a duplicate entry in a particular destination group of a selected routing intermediary to be removed, wherein the duplicate entry was introduced in response to a determination that a particular fast-path packet processing node is no longer to be used for the packet processing application, the computer-implemented method further comprising:
  causing to be selected, using a pseudo-random number based algorithm, the routing intermediary from whose destination group the duplicate entry is to be removed.

12. The computer-implemented method as recited in claim 6, further comprising:
  providing, to the particular routing intermediary, an indication of a source group assigned to the particular routing intermediary, wherein the source group comprises one or more fast-path packet processing nodes of the packet processing service which are configured to send packets to the particular routing intermediary; and
  verifying, by the particular routing intermediary prior to transmitting a particular packet received at the particular routing intermediary, that the particular packet was received from a fast-path packet processing node of the source group.

13. The computer-implemented method as recited in claim 6, wherein a particular routing intermediary of the plurality of routing intermediaries comprises one of: (a) an edge device of a virtualized computing service or (b) a virtualization management component of a virtualization server of a virtualized computing service.

14. The computer-implemented method as recited in claim 6, wherein the packet processing application comprises one or more of: (a) a source address substitution application, (b) a multicast application, (c) an anycast application, (d) a load balancing application, (e) an application for directing traffic between isolated virtual networks of a provider network, (f) a usage tracking application, (g) an intrusion detection application or (h) a data exfiltration detection application.

15. The computer-implemented method as recited in claim 6, further comprising:
  receiving a first packet of a particular packet flow at a particular fast-path packet processing node of the destination group assigned to the particular routing intermediary;
  in response to detecting, by the particular fast-path packet processing node, that a packet processing rule applicable to the particular packet flow is not present in a cache,
    transmitting a cache miss message by the particular fast-path packet processing node to an exception-path packet processing node of the packet processing service;
    storing, in the cache by the particular fast-path packet processing node, a packet processing rule provided by the exception-path packet processing node; and
    using, by the particular fast-path packet processing node, the stored packet processing rule to perform one or more packet processing operations with respect to another packet of the particular packet flow.

16. One or more non-transitory computer-accessible storage media storing program instructions that when executed on or across one or more processors cause the one or more processors to:
  provide, to individual ones of a plurality of routing intermediaries associated with a packet processing application for packets transmitted between a first collection of communicating devices and a second collection of communicating devices, an indication of a respective destination group assigned to the routing intermediary, wherein, with respect to a particular routing intermediary, the destination group comprises a set of fast-path packet processing nodes of a packet processing service, and wherein the particular routing intermediary is configured to transmit packets originating at a communicating device of the first collection to a fast-path packet processing node of the destination group for implementation of a packet processing rule of the packet processing application;

determine that the set of fast-path packet processing nodes to be included in the destination groups of the plurality of routing intermediaries has changed; and cause the destination groups of the plurality of routing intermediaries to be updated such that the proportion of routing intermediaries whose destination groups are updated to reflect the change in the set of the fast-path packet processing nodes increases from a first portion of an update propagation interval to a subsequent portion of the update propagation interval.

17. The one or more non-transitory computer-accessible storage media as recited in claim 16, wherein to cause the destination groups of the plurality of routing intermediaries to be updated, the one or more non-transitory computer-accessible storage media store further program instructions that when executed on or across one or more processors:

cause a pseudo-random number based algorithm to be used to select a time during an update propagation interval at which the destination group of a particular routing intermediary is modified.

18. The one or more non-transitory computer-accessible storage media as recited in claim 16, wherein to cause the destination groups of the plurality of routing intermediaries to be updated, the one or more non-transitory computer-accessible storage media store further program instructions that when executed on or across one or more processors:

cause a pseudo-random number based algorithm to be used to determine a sequence in which the respective destination groups of individual ones of the plurality of routing intermediaries are updated.

19. The one or more non-transitory computer-accessible storage media as recited in claim 16, wherein at least one device of the first collection of communicating devices is a compute instance of a virtualized computing service of a provider network, wherein the provider network comprises one or more data centers, and wherein at least one device of the second collection of communicating devices comprises a device located at a premise external to the one or more data centers.

20. The one or more non-transitory computer-accessible storage media as recited in claim 16, wherein the respective destination groups assigned to the plurality of routing intermediaries comprise fast path packet processing nodes of a first cell of a plurality of cells of data plane resources of the packet processing service, wherein the one or more non-transitory computer-accessible storage media store further program instructions that when executed on or across one or more processors:

determine that traffic of the packet processing application is to be migrated to a second cell of the packet processing service; and implement a multi-phase cell-to-cell migration comprising at least a first phase and a second phase, wherein:

in the first phase, a first configuration message is sent to the particular routing intermediary indicating that the second cell has been selected as a source of packets for the particular routing intermediary, and that the first cell remains selected as a source and a destination of packets with respect to the particular routing intermediary; and in response to a determination that the first phase has been completed, the second phase is initiated, wherein in the second phase, a second configuration message is sent to the particular routing intermediary indicating that the second cell has also been selected as a destination of packets with respect to the particular routing intermediary.

\* \* \* \* \*